United States Patent
Kang

(10) Patent No.: US 9,930,196 B2
(45) Date of Patent: Mar. 27, 2018

(54) IMAGE FORMING APPARATUS AND METHOD FOR CONTROLLING DISPLAY OF POP-UP WINDOW

(71) Applicant: S-PRINTING SOLUTION CO., LTD., Suwon-si, Gyeonggi-do (KR)

(72) Inventor: Soo-young Kang, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/249,745

(22) Filed: Apr. 10, 2014

(65) Prior Publication Data
US 2015/0131121 A1    May 14, 2015

(30) Foreign Application Priority Data
Nov. 13, 2013 (KR) .................. 10-2013-0137888

(51) Int. Cl.
*G06F 3/12* (2006.01)
*H04N 1/00* (2006.01)

(52) U.S. Cl.
CPC ..... *H04N 1/00472* (2013.01); *H04N 1/00129* (2013.01); *H04N 1/00307* (2013.01); *H04N 1/00477* (2013.01); *H04N 2201/0039* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 6,622,266 B1 | 9/2003 | Goddard et al. | |
| 6,734,985 B1* | 5/2004 | Ochiai | 358/1.15 |
| 7,019,855 B1* | 3/2006 | Lee | 358/1.15 |
| 7,176,898 B2* | 2/2007 | Litwiller | 345/173 |
| 7,831,167 B2* | 11/2010 | Huber et al. | 399/81 |
| 8,848,210 B2* | 9/2014 | Asano | 358/1.13 |
| 8,854,677 B2* | 10/2014 | Oguma | 358/1.15 |
| 8,879,087 B2* | 11/2014 | Ito | H04N 1/00244 358/1.1 |
| 2002/0075508 A1* | 6/2002 | Luman | G06F 3/1207 358/1.15 |
| 2007/0083797 A1 | 4/2007 | Tsuzuki | |

(Continued)

FOREIGN PATENT DOCUMENTS

| | | |
|---|---|---|
| EP | 2437479 A1 | 4/2012 |
| JP | 2013-183586 | 9/2013 |

OTHER PUBLICATIONS

International Search Report mailed Oct. 13, 2014 in related International Application No. PCT/KR2014/005733.

(Continued)

*Primary Examiner* — Dung Tran
(74) *Attorney, Agent, or Firm* — Staas & Halsey LLP

(57) ABSTRACT

A method of controlling display of a pop-up window and an apparatus are provided. The method performed by an image forming apparatus includes determining at least one target device to be requested to display the pop-up window from among devices connected to the image forming apparatus when a pop-up event is generated during operations of the image forming apparatus, and transmitting information about the pop-up event to the determined at least one target device.

23 Claims, 15 Drawing Sheets

| pop-up event | user interface unit or admin device | mobile device | | | | |
|---|---|---|---|---|---|---|
| | | job request device | foreground | | recently used device | all connected |
| | | | copy, print, scan | fax | | |
| Tray | Tray confirmation | O | O | O | | O |
| Error | Error Message | O | O | O | | O | O |
| Job related | Paper Empty / Mismatch | O | O | | | | |
| | Jam Recovery | | | | | | |
| Fax | Caller ID | O | O | | | O | |
| Power | Power off | O | O | O | O | | |

(56) References Cited

U.S. PATENT DOCUMENTS

| | | | |
|---|---|---|---|
| 2008/0240827 A1* | 10/2008 | Yamazaki | G06F 3/1204 400/73 |
| 2009/0237705 A1* | 9/2009 | Ikeda | 358/1.14 |
| 2011/0055736 A1* | 3/2011 | Kang et al. | 715/760 |
| 2011/0083076 A1 | 4/2011 | Kang | |
| 2011/0134468 A1 | 6/2011 | Gha | |
| 2012/0081729 A1 | 4/2012 | Kang et al. | |
| 2012/0140263 A1 | 6/2012 | Oba | |
| 2012/0212758 A1 | 8/2012 | Eom et al. | |
| 2012/0250070 A1* | 10/2012 | Sakamoto | G06F 3/121 358/1.14 |
| 2013/0061251 A1 | 3/2013 | Schwartz et al. | |
| 2013/0073750 A1 | 3/2013 | Nakane | |
| 2013/0138728 A1 | 5/2013 | Kim et al. | |
| 2013/0169986 A1 | 7/2013 | Lee et al. | |
| 2013/0194604 A1 | 8/2013 | Asano | |
| 2013/0215465 A1* | 8/2013 | Mutsuno | G06F 3/1204 358/1.15 |
| 2013/0273850 A1 | 10/2013 | Kim et al. | |
| 2013/0335772 A1* | 12/2013 | Waller | H04N 1/00244 358/1.15 |
| 2014/0009784 A1* | 1/2014 | Nara | 358/1.15 |
| 2015/0116755 A1* | 4/2015 | Hayakawa | G06F 3/1288 358/1.14 |

OTHER PUBLICATIONS

Extended European Search Report dated Dec. 119, 2016 in corresponding European Patent Application No. 14 86 2621.
European Office Action dated May 31, 2017 in corresponding European Patent Application No. 14 862 621.1.

* cited by examiner

FIG. 4

| pop-up event | | user interface unit or admin device | job request device | mobile device | | | | |
|---|---|---|---|---|---|---|---|---|
| | | | | foreground | | | recently used device | all connected |
| | | | | copy, print, scan | | fax | | |
| Tray | Tray confirmation | O | O | O | | | O | |
| Error | Error Message | O | O | O | | | O | O |
| Job related | Paper Empty / Mismatch | O | O | | | | | |
| | Jam Recovery | | | | | | | |
| Fax | Caller ID | O | O | | | O | | |
| Power | Power off | O | O | O | | O | | |

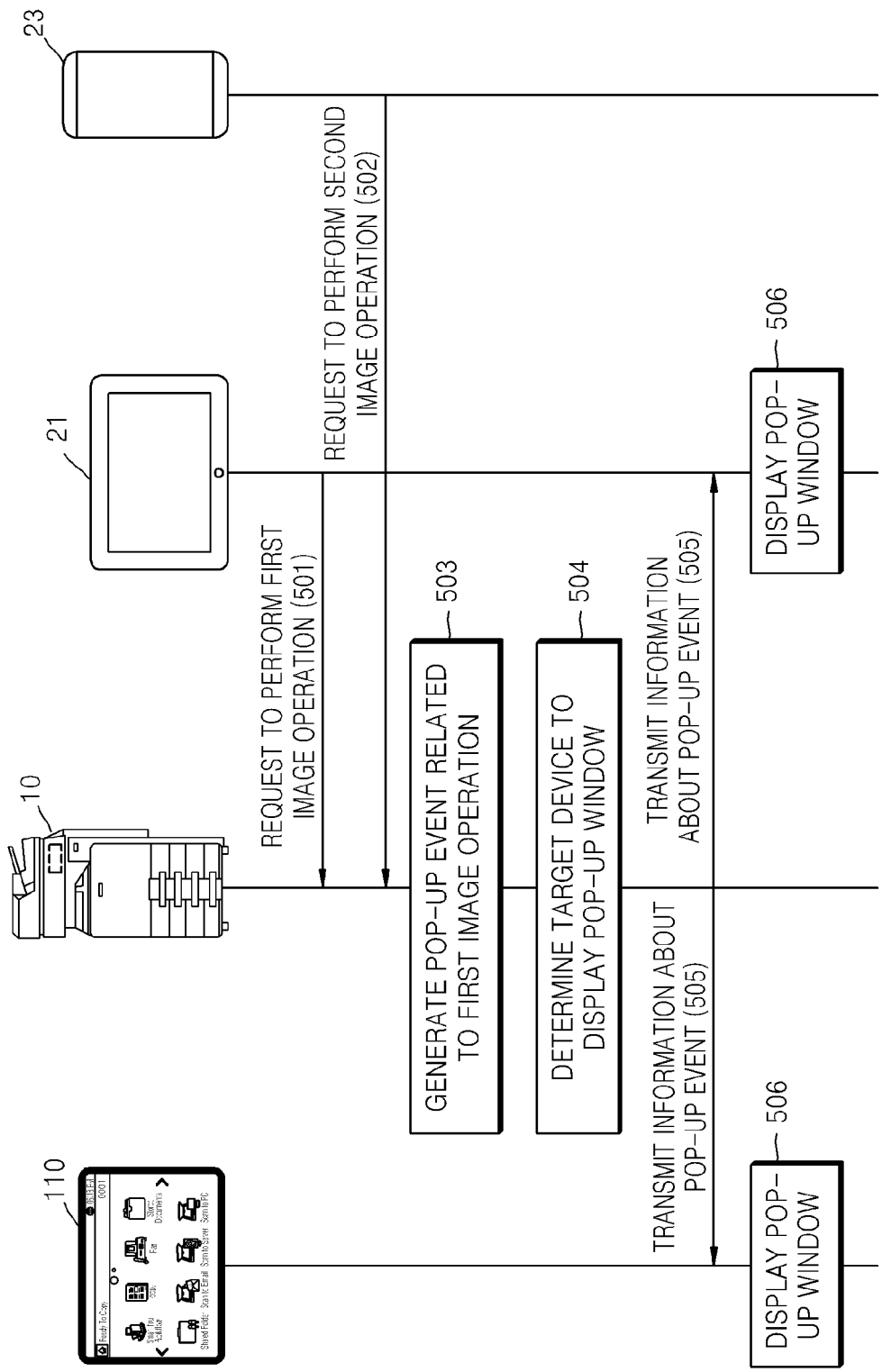

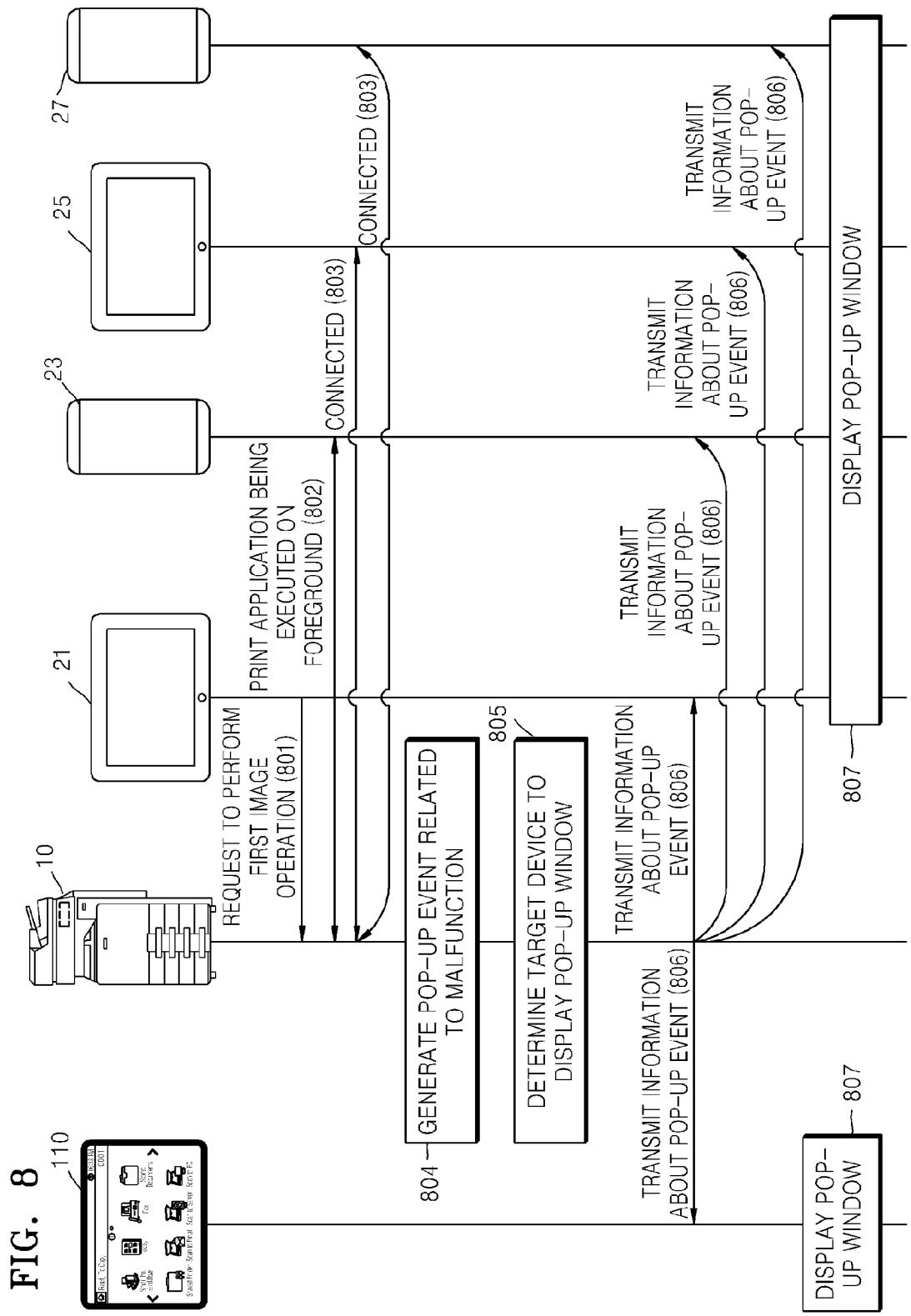

IMAGE FORMING APPARATUS AND METHOD FOR CONTROLLING DISPLAY OF POP-UP WINDOW

CROSS-REFERENCE TO RELATED APPLICATIONS

This application is related to, and claims the priority benefit of, Korean Patent Application No. 10-2013-0137888, filed on Nov. 13, 2013, in the Korean Intellectual Property Office, the disclosure of which is incorporated herein in its entirety by reference.

BACKGROUND

1. Field

One or more embodiments relate to an image forming apparatus and a method of controlling display of a pop-up window, wherein the method is performed by the image forming apparatus.

2. Description of the Related Art

Various image forming apparatuses, such as printers, copy machines, fax machines, and multi-function printers (MFPs) include a user interface (UI) screen for a user to control operations of the image forming apparatuses and/or input data. The UI screen enables the user to easily control the operations of an image forming apparatus. With development of science, hardware and software used in image forming apparatuses has developed, and thus functions for controlling the image forming apparatuses via UI screens are developing.

With the spread of smart devices, various print applications for controlling functions of image forming apparatuses have been developed, and thus it is possible to remotely control the image forming apparatuses by using the smart devices like the UI screens of the image forming apparatuses.

SUMMARY

One or more embodiments include an image forming apparatus and method for controlling display of a pop-up window. One or more embodiments include a non-transitory computer-readable recording medium having recorded thereon a program for executing the method.

Additional aspects will be set forth in part in the description which follows and, in part, will be apparent from the description, or may be learned by practice of the presented embodiments.

According to one or more embodiments, a method of controlling display of a pop-up window performed by an image forming apparatus includes monitoring generation of a pop-up event during operations of the image forming apparatus, when the pop-up event is generated, determining at least one target device that is to be requested to display a pop-up window indicating the pop-up event from among devices connected to the image forming apparatus, and transmitting information about the event to the determined at least one target device, wherein the connected devices include a removable user interface unit of the image forming apparatus and at least one external mobile device.

The determining may include determining the at least one target device based on types of the generated pop-up event.

The determining may include determining the at least one target device considering states of the connected devices according to the types of the generated pop-up event.

The types of the generated pop-up event may include at least one of an event about a state of a tray, an event about malfunction generated in the image forming apparatus, an event about a paper jam, an event about no paper, an event about a paper size mismatch, an event about fax reception, and an event about turning off power.

The states of the connected devices may include at least one of a state where an image operation is already requested, a state where a print application about the image operation is being executed on a foreground, and a state where the print application is standing by on a background.

The method may further include pre-storing rules for determining the at least one target device when the pop-up event is generated, wherein the determining may include determining the at least one target device by using the pre-stored rules.

The determining may include determining a mobile device in a state where an image operation is already requested as the at least one target device, when the pop-up event is related to the image operation.

The image operation may include at least one of a copy operation, a print operation, and a scan operation, and the pop-up event may include at least one of an event about a paper jam, an event about no paper, and an event about a paper size mismatch.

The determining may include determining a mobile device in a state where an image operation is already requested, a state where a print application about the image operation is being executed on a foreground, or a state where the print application is standing by on a background as the at least one target device, when the pop-up event is related to an event about a state of a tray.

The determining may include determining all of the devices connected to the image forming apparatus as the at least one target device, when the pop-up event is related to malfunction of the image forming apparatus.

The determining may include determining a mobile device in a state where an image operation is already requested or a state where a print application about the image operation is being executed on a foreground as the at least one target device, when the pop-up event is related to turning off the image forming apparatus.

The determining may include determining the removable user interface unit as the at least one target device regardless of types of the generated pop-up event, when the pop-up event is generated.

The determining may include determining a mobile device logged in as a manager from among the connected devices as the at least one target device regardless of types of the generated pop-up event, when the pop-up event is generated.

The method may include, when the information about the pop-up event is transmitted to a plurality of target devices, processing the pop-up event by using a user command that is first received from among user commands input from the plurality of target devices.

According to one or more embodiments, an image forming apparatus for controlling display of a pop-up window includes a control unit for determining at least one target device that is to be requested to display a window indicating an event from among devices connected to the image forming apparatus, when the event is generated during operations of the image forming apparatus, and a network interface unit for transmitting information about the event to the determined at least one target device, wherein the connected devices include a removable user interface unit of the image forming apparatus and at least one external mobile device.

The control unit may determine the at least one target device based on types of the generated pop-up event.

The image forming apparatus may include a storage unit for pre-storing rules for determining the at least one target device when the pop-up event is generated, wherein the control unit may determine the at least one target device by using the pre-stored rules.

The control unit may determine a mobile device in a state where an image operation is already requested as the at least one target device, when the pop-up event is related to the image operation.

The control unit may determine the removable user interface unit or a mobile device logged in as a manager from among the connected devices as the at least one target device regardless of types of the generated pop-up event, when the pop-up event is generated.

The network interface unit may receive user commands input from a plurality of target devices when the information about the pop-up event is transmitted to the plurality of target devices, and the control unit may process the pop-up event by using a user command that is first received from among the received user commands.

BRIEF DESCRIPTION OF THE DRAWINGS

These and/or other aspects will become apparent and more readily appreciated from the following description of the embodiments, taken in conjunction with the accompanying drawings in which:

FIG. 4 is a table illustrating rules for determining a target device when a pop-up event is generated in an image forming apparatus, according to an embodiment;

FIG. 5A illustrates operations of an image forming apparatus for controlling display of pop-up windows of a user interface (UI) unit and mobile devices, when a pop-up event related to an image operation is generated, according to an embodiment;

FIG. 8 illustrates operations of an image forming apparatus for controlling display of pop-up windows of a UI unit and mobile devices, when a pop-up event related to malfunction of an image forming apparatus is generated, according to an embodiment;

DETAILED DESCRIPTION

Figure 1:
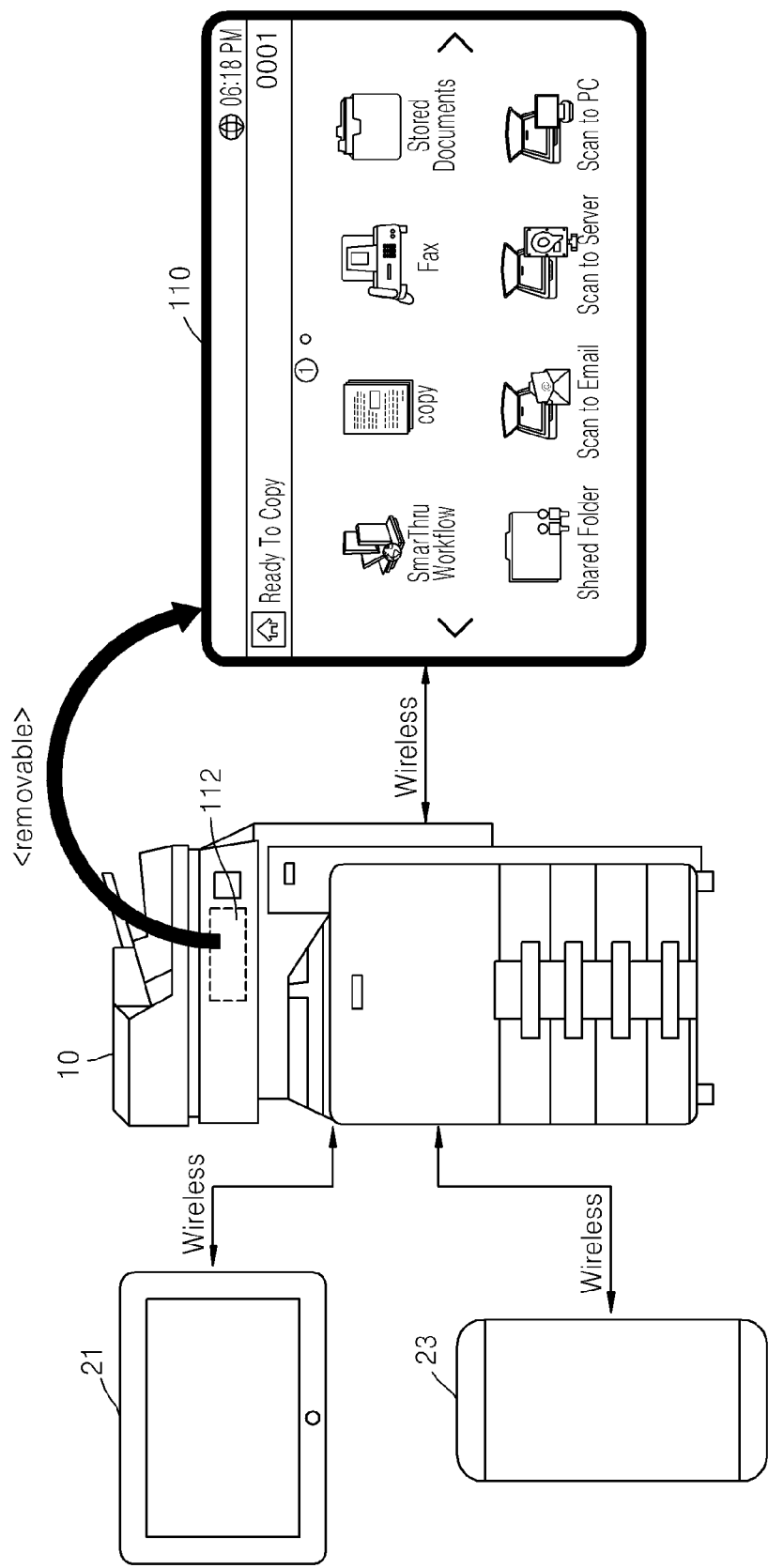
FIG. 1 illustrates an image forming system according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are described below, by referring to the figures, to explain aspects of the description.

FIG. 1 illustrates an image forming system according to an embodiment.

As illustrated in FIG. 1, the image forming system may include an image forming apparatus 10 and various external mobile devices, such as first and second mobile devices 21 and 23, which are connected to the image forming apparatus 10.

The first mobile device 21 may, for example, correspond to a tablet, and the second mobile device 23 may correspond to, for example, to a smartphone. Exemplary examples of the first and second mobile devices 21 and 23 include various devices connectable to the image forming apparatus 10 wirelessly and/or via wires, such as a laptop, a personal computer (PC), a personal digital assistant (PDA), and a wearable device, etc.

FIG. 1 illustrates an image forming system including the image forming apparatus 10, the first mobile device 21, and the second mobile device 23 for convenience of description, but an embodiment is not limited thereto, and the image forming system may additionally include various types of devices.

An exemplary image forming system may include general-purpose hardware components, such as an access point (AP) and a network hub (not illustrated in FIG. 1).

The image forming apparatus 10 may correspond to an individual device, such as a printer, a scanner, a copy machine, or a fax machine, or may correspond to a multi-function printer (MFP) performing various functions of such individual devices.

The image forming apparatus 10 includes a user interface (UI) unit 110 for displaying information processed by the image forming apparatus 10 or receiving a user input.

In the image forming apparatus 10 according to an embodiment, the UI unit 110 may be removable by manipulation by the user.

When the UI unit 110 is mounted in a combining unit 112 on the image forming apparatus 10, the UI unit 110 may perform a mobile function with the user, for example, by communicating with a board, e.g., main board in the image forming apparatus 10 through a peripheral component interconnect (PCI) bus and/or a universal serial bus (USB).

When the UI unit 110 is separated from the combining unit 112 on the image forming apparatus 10, the UI unit 110 may wirelessly communicate with the image forming apparatus 10 in order to perform, e.g., continuously perform an interface function with the user. Even when the UI unit 110 is separated from the image forming apparatus 10, the UI unit 110 may operate as if it is mounted on the image forming apparatus 10.

When the UI unit 110 is separated from the image forming apparatus 10, the UI unit 110 may communicate with the image forming apparatus 10 via various wireless communication methods, such as Wi-Fi, Wi-Fi direct, Bluetooth, and near field communication (NFC), etc.

The UI unit 110 of the image forming apparatus 10 according to an embodiment may perform an interface function with a user by being mounted on or separated from the image forming apparatus 10.

The image forming apparatus 10 may communicate with the first or second mobile device 21 or 23 via various communication methods, such as Wi-Fi, Wi-Fi direct, Bluetooth, or NFC. The image forming apparatus 10 may communicate with the first and/or second mobile device 21 and/or 23 via wires.

Figure 2:
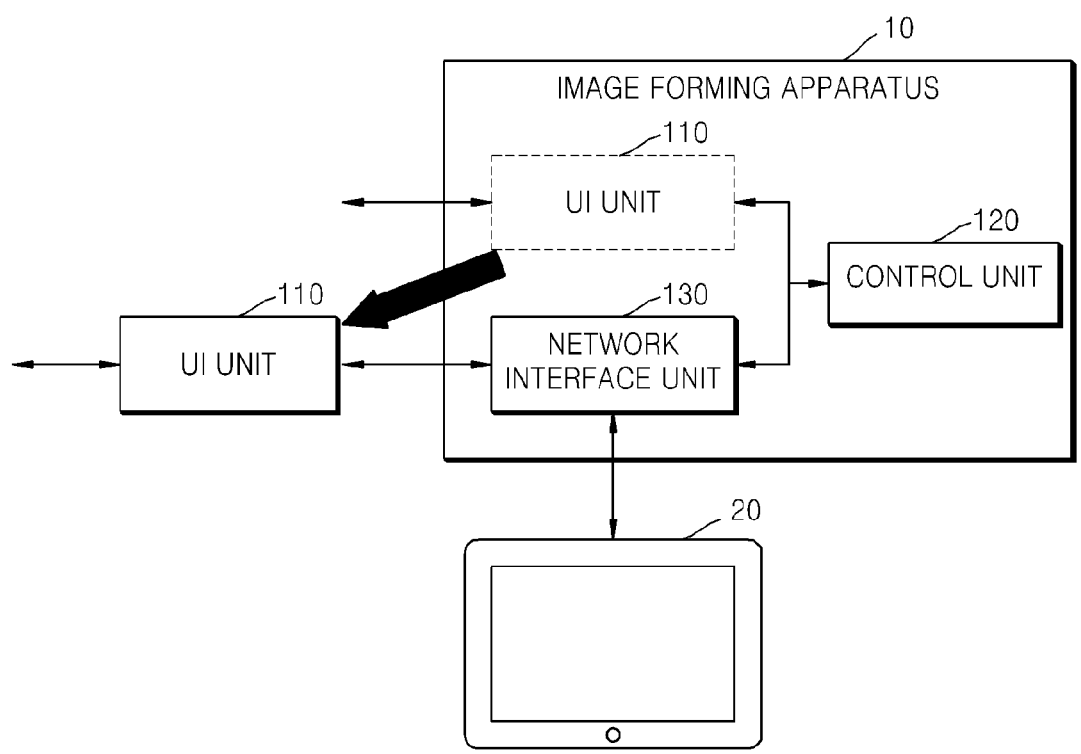
FIG. 2 illustrates an image forming apparatus according to an embodiment.

FIG. 2 illustrates an image forming apparatus 10 according to an embodiment.

As illustrated in FIG. 2, the image forming apparatus 10 may include the UI unit 110, a control unit 120, and a network interface unit 130.

The image forming apparatus 10 may include general-purpose hardware components other than the hardware components illustrated in FIG. 2. For example, the image forming apparatus 10 may include hardware components, such as a printing unit for performing a copy or print operation, and/or a scanning unit for performing a scan operation, etc.

The UI unit 110 may be removable.

The control unit 120 of the image forming apparatus 10 may correspond to a processor, such as a central processing unit (CPU). The processor may be an array of a plurality of logic gates or as a general-purpose microprocessor. An exemplary processor may be a hardware and/or software module.

The network interface unit 130 is hardware for performing functions for the image forming apparatus 10 to be connected to a wired and/or wireless network, and may include a wired communication module (an Ethernet interface) and/or a wireless communication module (a wireless local area network (WLAN) supporting Wi-Fi or Wi-Fi direct, an NFC module, and/or a Bluetooth module).

A mobile device 20 of FIG. 2 may be the first or second mobile device 21 or 23, for example, described above with reference to FIG. 1.

Operations and functions of components of the image forming apparatus 10 are disclosed.

Figure 3:
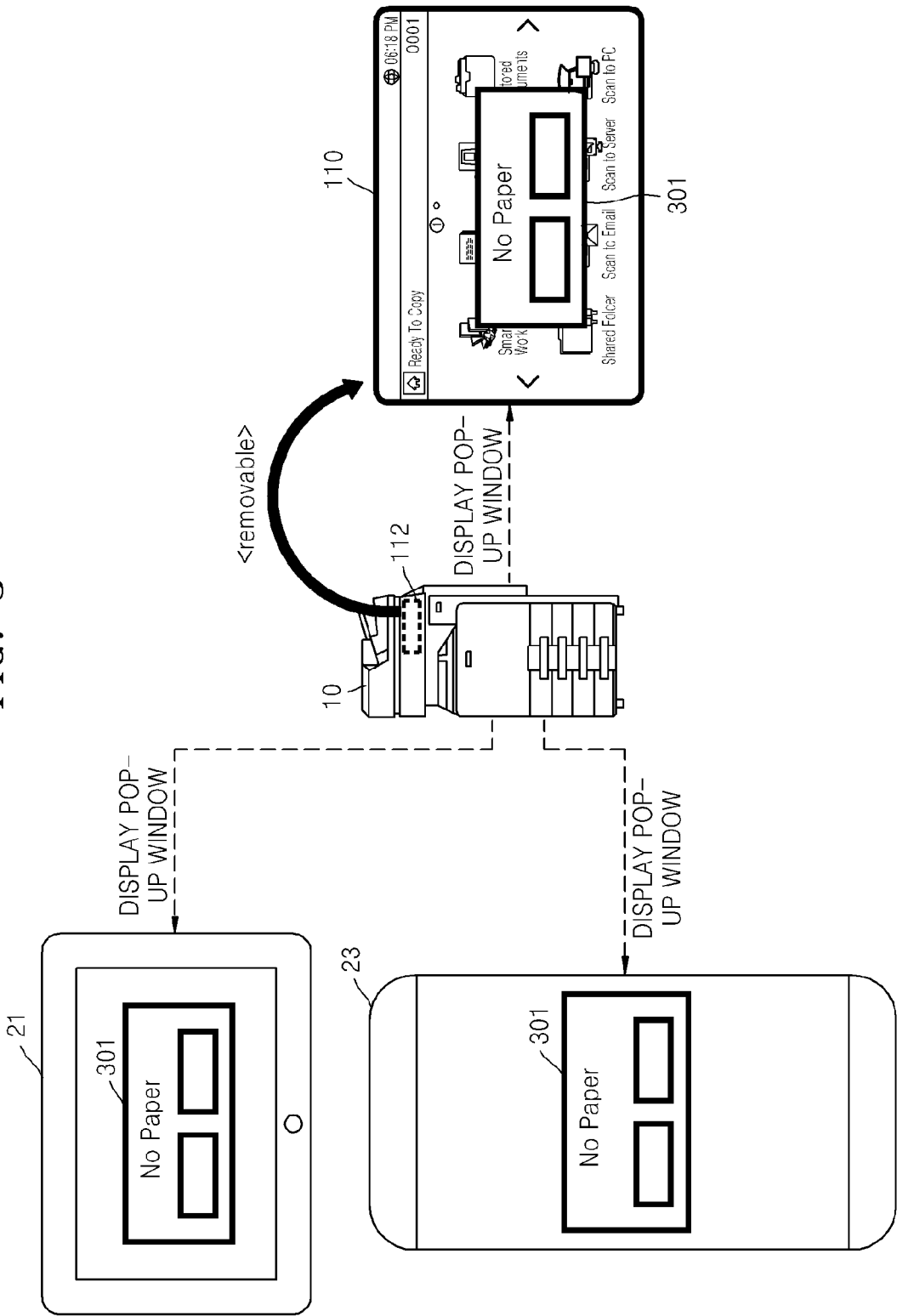
FIG. 3 illustrates operations of the image forming apparatus for controlling display of a pop-up window, according to an embodiment.

FIG. 3 illustrates operations of the image forming apparatus 10 for controlling display of a window, e.g., pop-up window, according to an embodiment.

As illustrated in FIG. 3, the UI unit 110 of the image forming apparatus 10 may interface with the user by being separated from the combining unit 112 of the image forming apparatus 10.

The image forming apparatus 10 may be wirelessly connected to the first mobile device 21, the second mobile device 23, and the separated UI unit 110.

When a message about an image operation needs to be displayed to the user, when an input of the user is required, or when the image forming apparatus 10 malfunctions while the first mobile device 21, the second mobile device 23, or the UI unit 110 uses the image forming apparatus 10, the image forming apparatus 10 may control the first mobile device 21, the second mobile device 23, and/or the UI unit 110 to display a pop-up window 301 on a UI screen of the first mobile device 21, the second mobile device 23, and/or the UI unit 110.

For example, when papers selected by the user are not sufficient in the image forming apparatus 10 while a copy operation is performed through the first mobile device 21, the image forming apparatus 10 may control the first mobile device 21 to display the pop-up window 301 notifying that there is no paper on the UI screen of the first mobile device 21.

Such an operation may also be applied when the copy operation is performed by using another device, e.g., the second mobile device 23 or the UI unit 110.

When a pop-up event is generated in the image forming apparatus 10, the image forming apparatus 10 may provide information about the pop-up event through the pop-up window 301 displayed on the UI screen of the first mobile device 21, the second mobile device 23, and/or the UI unit 110 connected to the image forming apparatus 10.

The image forming apparatus 10 may determine one of the first mobile device 21, the second mobile device 23, and the UI unit 110 that is to receive the generated pop-up event and display the pop-up window 301.

If the image operation is performed in the image forming apparatus 10, for example, only through the first mobile device 21, and the second mobile device 23 is only simply connected to the image forming apparatus 10, the pop-up event related to the image operation generated in the image forming apparatus 10 may only required by the first mobile device 21 and may not be required by the second mobile device 23.

Accordingly, if the image forming apparatus 10 controls not only the first mobile device 21 but also the second mobile device 23 to display the pop-up window 301, the second mobile device 23 may unnecessarily display the pop-up window 301 and thus may interfere in a normal operation.

When the UI unit 110 and the first and second mobile devices 21 and 23 are connected to the image forming apparatus 10 on a network, the image forming apparatus 10 may provide the information about the generated pop-up event to at least one target device, for example, pre-determined according to pre-set rules.

FIG. 4 is a table illustrating rules for determining a target device when a pop-up event is generated in the image forming apparatus 10, according to an embodiment.

According to the rules illustrated in FIG. 4, the target device may be determined by considering states of devices according to types of the pop-up event.

When all pop-up events are generated, the UI unit 110 may be determined as the target device regardless of types of the generated pop-up events. When all pop-up events are generated, a mobile device logged in as a manager from among connected devices may be determined as the target device instead of the UI unit 110, regardless of the types of the generated pop-up events.

When a pop-up event is generated, the UI unit 110 or the mobile device logged in as a manager may be determined, e.g., always determined as the target device for displaying a pop-up window.

When the pop-up event is an event about a state of a tray, the image forming apparatus 10 determines a mobile device in a state where an image operation is already requested, a state where a print application about the image operation is being executed on a foreground, and/or a state where the print application is standing by on a background is selected as the target device, from among all devices connected to the image forming apparatus 10.

A state where the print application is being executed on the foreground may only include cases when a function related to a copy operation, a print operation, or a scan operation is activated from among functions of the print application, and may exclude a case when a function related to a fax operation is activated, but is not limited thereto.

When the pop-up event is related to malfunction of the image forming apparatus 10, all devices connected to the image forming apparatus 10 are determined as the target devices.

When the pop-up event is related to an image operation, the mobile device in the state where the image operation is already requested is determined as the target device.

The mobile device that already transmitted print data related to a print operation or requested to transmit scan data related to a scan operation may be determined as the target device.

Examples of the pop-up event related to the image operation may include an event about a paper jam, an event about no paper, and an event about a paper size mismatch.

When the pop-up event is related to a fax operation, a mobile device where a function about the fax operation in the print application being executed on the foreground is being executed may be determined as the target device.

When the pop-up event is related to turning off the image forming apparatus 10, a mobile device in a state where the image operation is already requested or a state where the print operation is being executed on the foreground is determined as the target device.

As such, the image forming apparatus 10 according to an embodiment may determine the target device based on the rules illustrated in FIG. 4 when the pop-up event is generated. However, the rules illustrated in FIG. 4 are only examples, and thus are not limited thereto. Accordingly, the target device may be determined based on rules other than those illustrated in FIG. 4.

The rules for determining the target device when the pop-up event is generated may be pre-stored in a storage unit (not shown) of an external server (not shown) of the image forming apparatus 10.

Operations of the image forming apparatus 10 for controlling display of a pop-up window when a pop-up event is generated, and operations of the UI unit 110 and first and second mobile devices 21 and 23 for displaying the pop-up window, are described in with reference to FIGS. 5A through 9.

FIG. 5A illustrates operations of an image forming apparatus 10 for controlling display of pop-up windows of the UI unit 110 and the first and second mobile devices 21 and 23, when a pop-up event related to an image operation is generated, according to an embodiment.

In operation 501, the first mobile device 21 requests the image forming apparatus 10 to perform a first image operation. The first image operation may include a copy operation, a print operation, or a scan operation using a print application executed in the first mobile device 21.

In operation 502, the second mobile device 23 requests the image forming apparatus 10 to perform a second image operation. The second image operation may include a copy operation, a print operation, or a scan operation using a print application executed in the second mobile device 23.

Even when the first and second image operations are the same type, the first and second image operations are requested by different mobile devices, e.g., the first and second mobile devices 21 and 23, and thus the image forming apparatus 10 manages job identifications (IDs) to be different.

In FIG. 5A, it may be assumed that the second image operation is requested by the second mobile device 23 (operation 502) after the first image operation is requested by the first mobile device 21 (operation 501), but an order of operations 501 and 502 may be switched.

In operation 503, the control unit 120 of the image forming apparatus 10 continuously monitors generation of a pop-up event during an operation of the image forming apparatus 10. As a result, the control unit 120 detects that a pop-up event related to the first image operation is generated during the operation of the image forming apparatus 10.

An event, e.g., pop-up event related to the first image operation may include an event about a paper jam, an event about no paper, and an event about a paper size mismatch.

In operation 504, the control unit 120 of the image forming apparatus 10 determines at least one target device to be requested to display a pop-up window indicating the pop-up event from among the UI unit 110 and the first and second mobile devices 21 and 23 connected to the image forming apparatus 10.

The control unit 120 may determine the target device to display the pop-up window based on the rules illustrated in FIG. 4.

As illustrated in FIG. 4, when a pop-up event related to an image operation is generated, a mobile device in a state where the image operation is already requested is determined as a target device. Accordingly, since it is monitored that the pop-up event related to the first image operation is generated in operation 503, the control unit 120 determines the UI unit 110 and the first mobile device 21 as the target devices based on the rules illustrated in FIG. 4.

In operation 505, the network interface unit 130 of the image forming apparatus 10 transmits information about the pop-up event to the determined target devices. Since the UI unit 110 and the first mobile device 21 are determined as the target devices in operation 504, the network interface unit 130 transmits the information about the pop-up event related to the first image operation to the UI unit 110 and the first mobile device 21.

In operation 506, the UI unit 110 and the first mobile device 21 display the pop-up window through UI screens based on the received information.

Since the generated pop-up event is only related to the first image operation, the pop-up window related to the first image operation is not displayed on the second mobile device 23 that requested the second image operation.

Figure 5B:
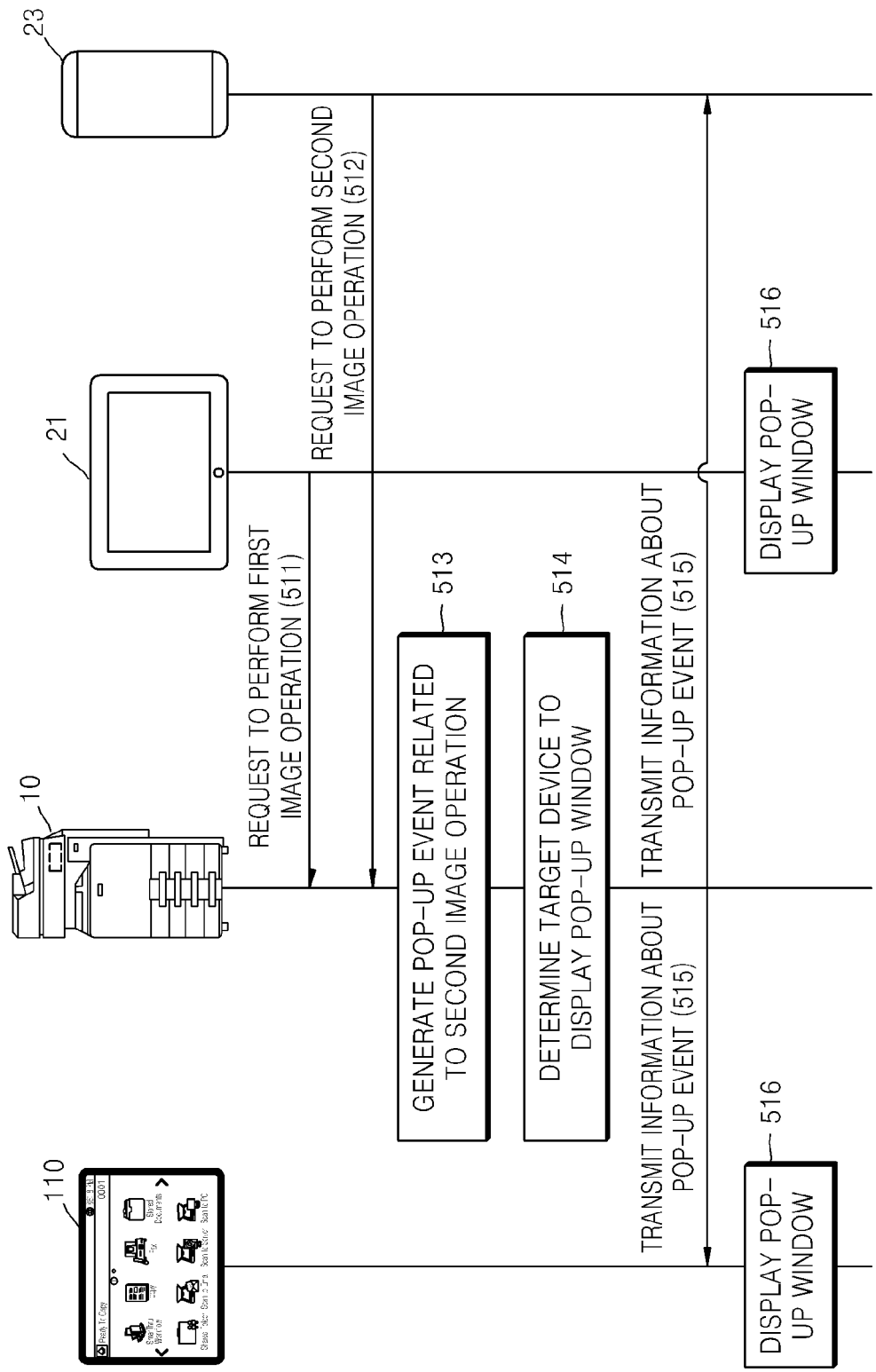
FIG. 5B illustrates operations of an image forming apparatus for controlling display of pop-up windows of a UI unit and mobile devices, when a pop-up event related to an image operation is generated, according to an embodiment.

FIG. 5B illustrates operations of the image forming apparatus 10 for controlling display of pop-up windows of the UI unit 110 and the first and mobile devices 21 and 23, when a pop-up event related to an image operation is generated, according to an embodiment.

As illustrated in FIG. 5B, a pop-up event related to a second image operation is generated.

In operation 511, the first mobile device 21 requests the image forming apparatus 10 to perform a first image operation. The first image operation may include a copy operation, a print operation, or a scan operation using a print application executed in the first mobile device 21.

In operation 512, the second mobile device 23 requests the image forming apparatus 10 to perform a second image operation. The second image operation may include a copy operation, a print operation, or a scan operation using a print application executed in the second mobile device 23.

Even when the first and second image operations may be the same type, the first and second image operations may be requested by different mobile devices, e.g., the first and second mobile devices 21 and 23, and thus the image forming apparatus 10 manages job IDs to be different.

In FIG. 5B, it may be assumed that the second image operation is requested by the second mobile device 23 (operation 512) after the first image operation is requested by the first mobile device 21 (operation 511), but an order of operations 511 and 512 may be switched.

In operation 513, the control unit 120 of the image forming apparatus 10 continuously monitors generation of a pop-up event during an operation of the image forming apparatus 10. As a result, the control unit 120 detects that a pop-up event related to the second image operation is generated during the operation of the image forming apparatus 10.

An event, e.g., pop-up event related to the second image operation may include an event about a paper jam, an event about no paper, and an event about a paper size mismatch.

In operation 514, the control unit 120 of the image forming apparatus 10 determines at least one target device to be requested to display a pop-up window indicating the pop-up event from among the UI unit 110 and the first and second mobile devices 21 and 23 connected to the image forming apparatus 10.

The control unit 120 may determine the target device to display the pop-up window based on the rules illustrated in FIG. 4.

As illustrated in FIG. 4, when a pop-up event related to an image operation is generated, a mobile device in a state where the image operation is already requested is determined as a target device. Thus, since it is monitored that the pop-up event related to the second image operation is generated in operation 513, the control unit 120 determines the UI unit 110 and the second mobile device 23 as the target devices based on the rules illustrated in FIG. 4.

In operation 515, the network interface unit 130 of the image forming apparatus 10 transmits information about the pop-up event to the determined target devices. Since the UI unit 110 and the second mobile device 23 are determined to be the target devices in operation 514, the network interface unit 130 transmits the information about the pop-up event related to the second image operation to the UI unit 110 and the second mobile device 23.

In operation 516, the UI unit 110 and the second mobile device 23 display the pop-up window through UI screens based on the received information.

Accordingly, according to FIG. 5B, since the generated pop-up event is only related to the second image operation, the pop-up window related to the second image operation is not displayed on the first mobile device 21 that requested the first image operation.

Figure 5C:
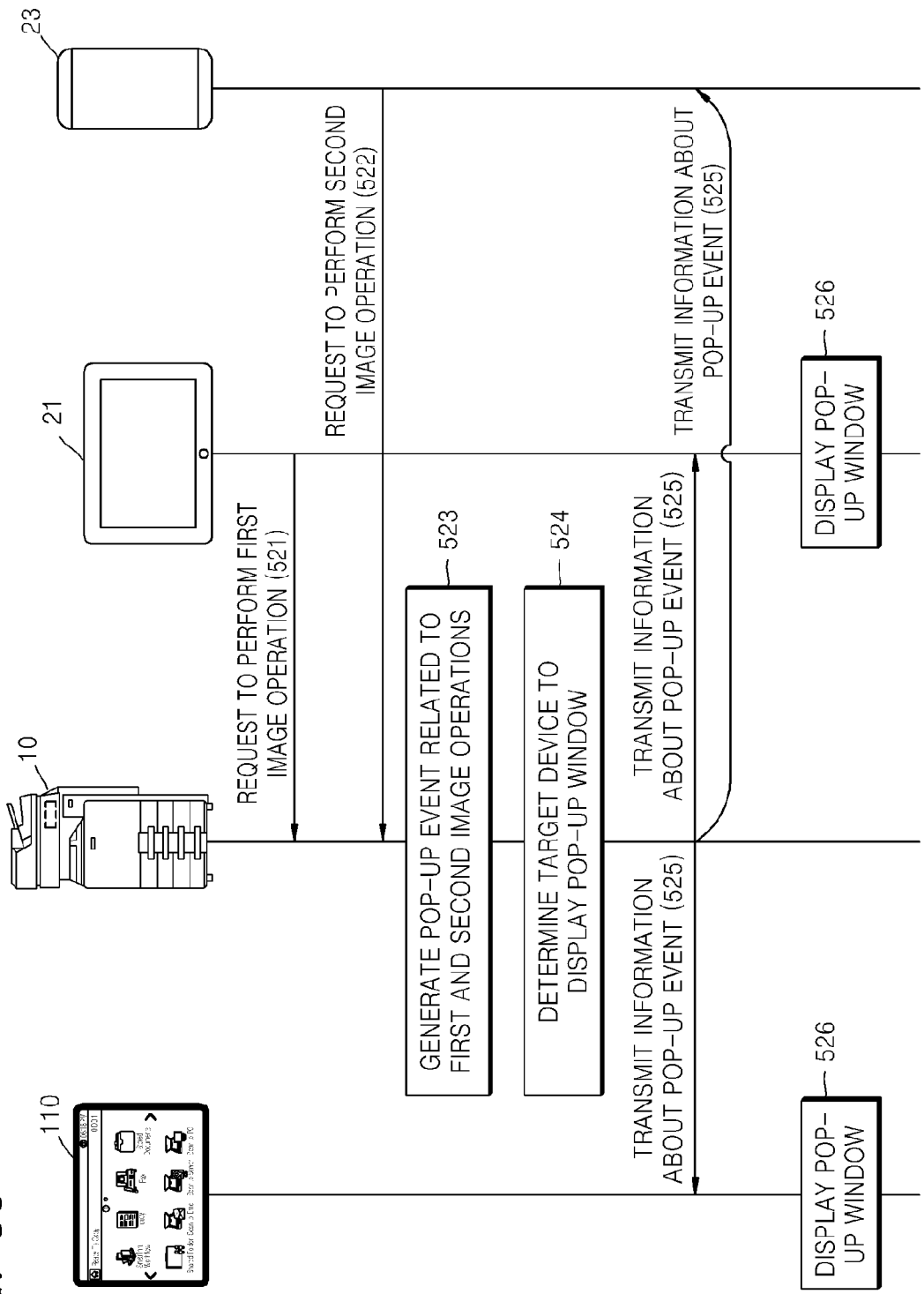
FIG. 5C illustrates operations of the image forming apparatus for controlling display of pop-up windows of a UI unit and mobile devices, when a pop-up event related to an image operation is generated, according to an embodiment.

FIG. 5C illustrates operations of the image forming apparatus 10 for controlling display of pop-up windows of the UI unit 110 and the first and second mobile devices 21 and 23, when a pop-up event related to an image operation is generated, according to an embodiment.

As illustrated in FIG. 5C, a pop-up event related to both of first and second image operations is generated.

In operation 521, the first mobile device 21 requests the image forming apparatus 10 to perform a first image operation. The first image operation may include a copy operation, a print operation, or a scan operation using a print application executed in the first mobile device 21.

In operation 522, the second mobile device 23 requests the image forming apparatus 10 to perform a second image operation. The second image operation may include a copy operation, a print operation, or a scan operation using a print application executed in the second mobile device 23.

Even when the first and second image operations are the same type, the first and second image operations are requested by different mobile devices, e.g., the first and second mobile devices 21 and 23, and thus the image forming apparatus 10 manages job IDs to be different.

In FIG. 5C, it may be assumed that the second image operation is requested by the second mobile device 23 (operation 522) after the first image operation is requested by the first mobile device 21 (operation 521), but an order of operations 521 and 522 may be switched.

In operation 523, the control unit 120 of the image forming apparatus 10 continuously monitors generation of a pop-up event during an operation of the image forming apparatus 10. As a result, the control unit 120 detects that the pop-up event related to both the first and second image operations is generated during the operation of the image forming apparatus 10.

An event, e.g., a pop-up event related to both the first and second image operations may include an event about a paper jam, an event about no paper, and an event about a paper size mismatch.

In operation 524, the control unit 120 of the image forming apparatus 10 determines at least one target device to be requested to display a pop-up window indicating a pop-up event from among the UI unit 110 and the first and second mobile devices 21 and 23 connected to the image forming apparatus 10.

The control unit 120 may determine the target device to display the pop-up window based on the rules illustrated in FIG. 4.

As illustrated in FIG. 4, when a pop-up event related to an image operation is generated, a mobile device in a state where the image operation is already requested is determined as a target device. Accordingly, since it is monitored that the pop-up event related to both the first and second image operations is generated in operation 523, the control unit 120 determines the UI unit 110, the first mobile device 21, and the second mobile device 23 as the target devices based on the rules illustrated in FIG. 4.

In operation 525, the network interface unit 130 of the image forming apparatus 10 transmits information about the pop-up event to the determined target devices. Since the UI unit 110, the first mobile device 21, and the second mobile device 23 are determined as the target devices in operation 524, the network interface unit 130 transmits the information about the pop-up event related to the first and second image operations to the UI unit 110, the first mobile device 21, and the second mobile device 23.

In operation 526, the UI unit 110, the first mobile device 21, and the second mobile device 23 display a pop-up window through UI screens based on the received information.

Figure 6A:
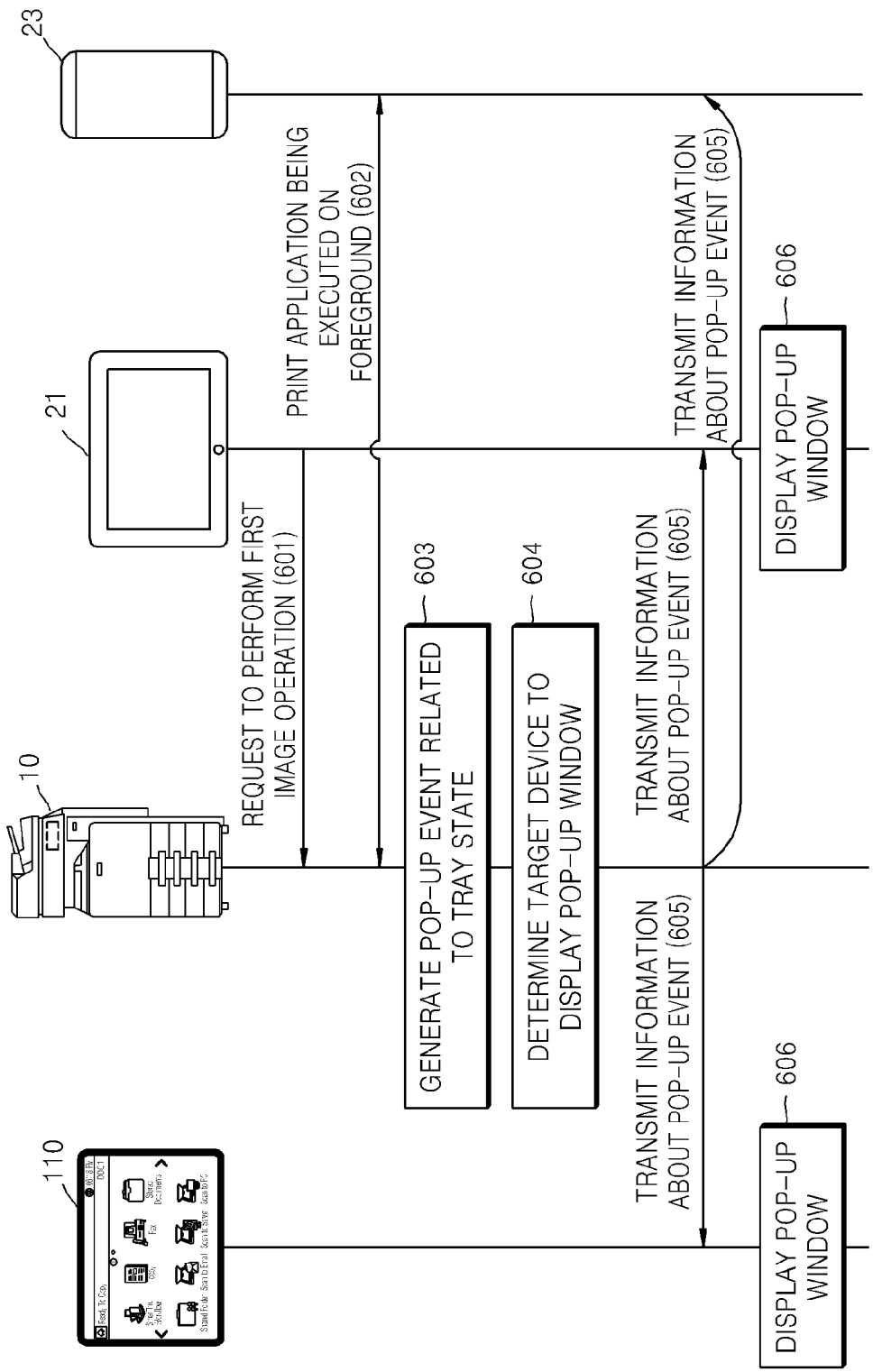
FIG. 6A illustrates operations of the image forming apparatus for controlling display of pop-up windows of a UI unit and mobile devices, when a pop-up event related to a state of a tray is generated, according to an embodiment.

FIG. 6A illustrates operations of the image forming apparatus 10 for controlling display of pop-up windows of the UI unit 110 and the first and second mobile devices 21 and 22, when a pop-up event related to a state of a tray is generated, according to an embodiment.

In operation 601, the first mobile device 21 requests the image forming apparatus 10 to perform a first image operation. The first image operation may include a copy operation, a print operation, or a scan operation using a print application executed in the first mobile device 21.

In operation 602, the second mobile device 23 is connected to the image forming apparatus 10, and did not separately request an image operation but is in a state where a print application is being executed on a foreground.

A state where the print application is being executed on the foreground may only include cases when a function related to a copy operation, a print operation, or a scan operation is activated from among functions of the print application, and may exclude a case when a function related to a fax operation is activated, but is not limited thereto.

In FIG. 6A, the print application is executed in the second mobile device 23 (operation 602) after the first image operation is requested by the first mobile device 21 (operation 601), but an order of operations 601 and 602 may be switched.

In operation 603, the control unit 120 of the image forming apparatus 10 continuously monitors generation of a pop-up event during an operation of the image forming apparatus 10. As a result, the control unit 120 detects that a pop-up event related to a state of a tray is generated during the operation of the image forming apparatus 10.

A pop-up event related to the state of a tray may denote an event generated when papers are newly put into a tray of the image forming apparatus 10 and the tray is closed.

In operation 604, the control unit 120 of the image forming apparatus 10 determines at least one target device to be requested to display a pop-up window indicating a pop-up event from among the UI unit 110 and the first and second mobile devices 21 and 23 connected to the image forming apparatus 10.

A control unit 120 may determine a target device to display a pop-up window based on the rules illustrated in FIG. 4.

As illustrated in FIG. 4, when the pop-up event related to the state of a tray is generated, a mobile device in a state where an image operation is already requested, a state where a print application is being executed on a foreground, or a state where a print application is standing by on a background is determined as a target device. Accordingly, the control unit 120 determines the UI unit 110, the first mobile device 21, and the second mobile device 23 as the target devices based on the rules illustrated in FIG. 4.

In operation 605, the network interface unit 130 of the image forming apparatus 10 transmits information about the pop-up event to the determined target devices. Since the UI unit 110, the first mobile device 21, and the second mobile device 23 are determined as the target devices in operation 604, the network interface unit 130 transmits the information about the pop-up event related to the state of a tray to the UI unit 110, the first mobile device 21, and the second mobile device 23.

In operation 606, the UI unit 110, the first mobile device 21, and the second mobile device 23 display the pop-up window through UI screens based on the received information.

Figure 6B:
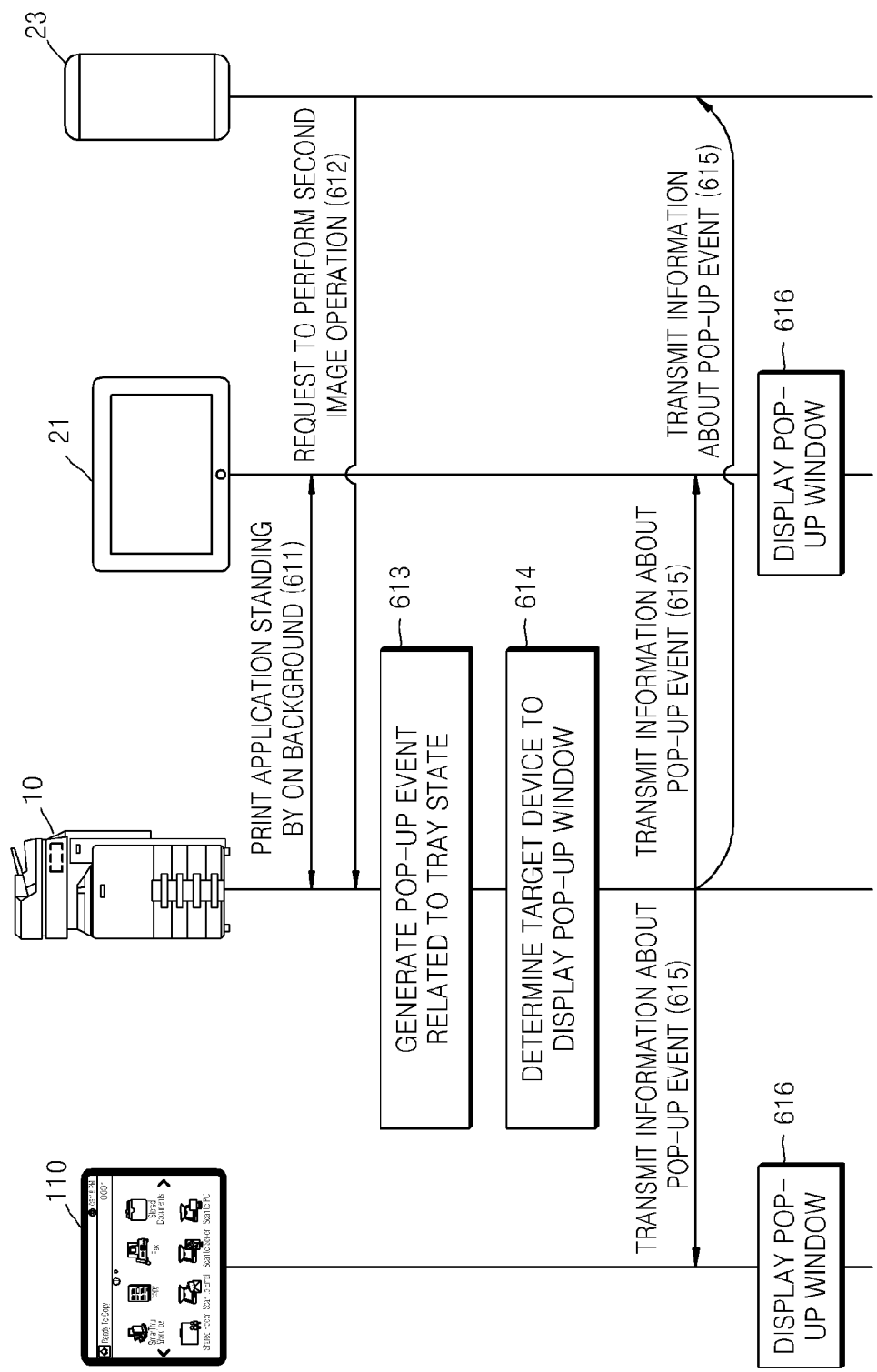
FIG. 6B illustrates operations of the image forming apparatus for controlling display of pop-up windows of the UI unit and mobile devices, when a pop-up event related to a state of a tray is generated, according to an embodiment.

FIG. 6B illustrates operations of the image forming apparatus 10 for controlling display of pop-up windows of the UI unit 110 and the first and second mobile devices 21 and 23, when a pop-up event related to a state of a tray is generated, according to an embodiment.

In operation 611, the first mobile device 21 is connected to the image forming apparatus 10, and did not separately request an image operation but is in a state where a print application is standing by on a background.

In operation 612, the second mobile device 23 requests the image forming apparatus 10 to perform a second image operation. The second image operation may include a copy operation, a print operation, or a scan operation using a print application executed in the second mobile device 23.

In FIG. 6B, it may be assumed that the second image operation is requested by the second mobile device 23 (operation 612) after the print application is standing by on the background in the first mobile device 21 (operation 611), but an order of operations 611 and 612 may be switched.

In operation 613, the control unit 120 of the image forming apparatus 10 continuously monitors generation of a pop-up event during an operation of the image forming apparatus 10. As a result, the control unit 120 detects that a pop-up event related to a state of a tray is generated during the operation of the image forming apparatus 10.

The pop-up event related to the state of a tray may denote an event generated when papers are newly put into a tray of the image forming apparatus 10 and the tray is closed.

In operation 614, the control unit 120 of the image forming apparatus 10 determines at least one target device to be requested to display a pop-up window indicating a pop-up event from among the UI unit 110 and the first and second mobile devices 21 and 23 connected to the image forming apparatus 10.

The control unit 120 may determine a target device to display a pop-up window based on the rules illustrated in FIG. 4.

As illustrated in FIG. 4, when the pop-up event related to the state of a tray is generated, a mobile device in a state where an image operation is already requested, a state where a print application is being executed on a foreground, or a state where a print application is standing by on a background is determined as a target device. Accordingly, the control unit 120 determines the UI unit 110, the first mobile device 21, and the second mobile device 23 as the target devices based on the rules illustrated in FIG. 4.

In operation 615, the network interface unit 130 of the image forming apparatus 10 transmits information about the pop-up event to the determined target devices. Since the UI unit 110, the first mobile device 21, and the second mobile device 23 are determined as the target devices in operation 614, the network interface unit 130 transmits the information about the pop-up event related to the state of a tray to the UI unit 110, the first mobile device 21, and the second mobile device 23.

In operation 616, the UI unit 110, the first mobile device 21, and the second mobile device 23 display the pop-up window through UI screens based on the received information.

Figure 7A:
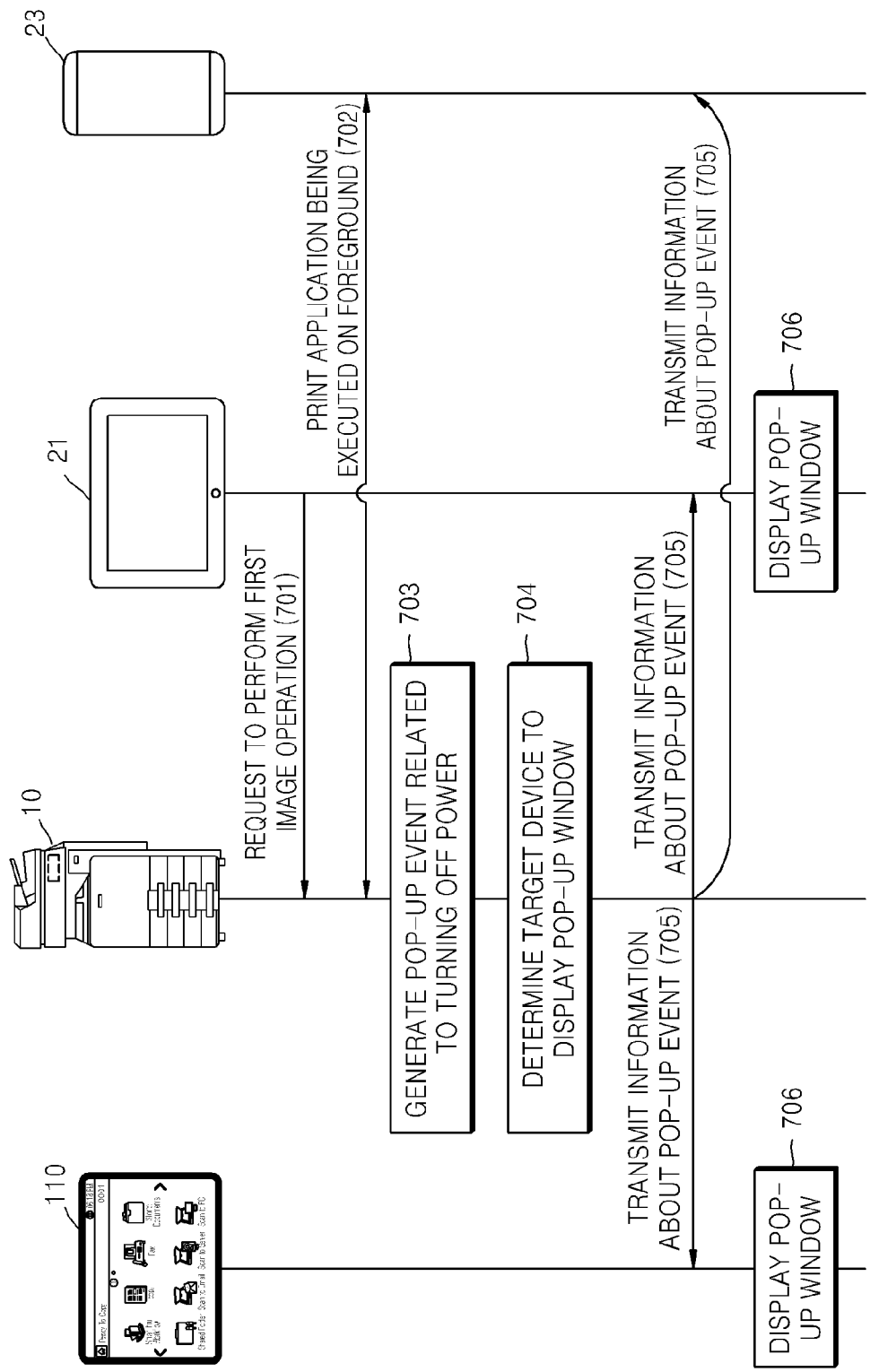
FIG. 7A illustrates operations of an image forming apparatus for controlling display of pop-up windows of a UI unit and mobile devices, when a pop-up event related to turning off power is generated, according to an embodiment.

FIG. 7A illustrates operations of the image forming apparatus 10 for controlling display of pop-up windows of the UI unit 110 and the first and second mobile devices 21 and 23, when a pop-up event related to turning off power is generated, according to an embodiment.

In operation 701, the first mobile device 21 requests the image forming apparatus 10 to perform a first image operation. The first image operation may include a copy operation, a print operation, or a scan operation using a print application executed in the first mobile device 21.

In operation 702, the second mobile device 23 is connected to the image forming apparatus 10, and did not separately request an image operation but is in a state where a print application is being executed on a foreground.

A state where the print application is being executed on the foreground may only include cases when a function related to a copy operation, a print operation, or a scan operation is activated from among functions of the print application, and may exclude a case when a function related to a fax operation is activated, but is not limited thereto.

In FIG. 7A, the print application is executed in the second mobile device 23 (operation 702) after the first image operation is requested by the first mobile device 21 (operation 701), but an order of operations 601 and 602 may be switched.

In operation 703, the control unit 120 of the image forming apparatus 10 continuously monitors generation of a pop-up event during an operation of the image forming apparatus 10. As a result, the control unit 120 detects that a pop-up event related to tuning off power is generated during the operation of the image forming apparatus 10.

A pop-up event related to turning off power may denote a pop-up event generated by a software button for powering off the image forming apparatus 10 through software installed in the image forming apparatus 10, instead of a physical hardware button included in the image forming apparatus 10.

In operation 704, the control unit 120 of the image forming apparatus 10 determines at least one target device to be requested to display a pop-up window indicating a pop-up event from among the UI unit 110 and the first and second mobile devices 21 and 23 connected to the image forming apparatus 10.

The control unit 120 may determine a target device to display a pop-up window based on the rules illustrated in FIG. 4.

As illustrated in FIG. 4, when the pop-up event related to turning off power is generated, a mobile device in a state where an image operation is already requested or a state where a print application is being executed on a foreground is determined as a target device.

Accordingly, the control unit 120 determines the UI unit 110, the first mobile device 21, and the second mobile device 23 as the target devices based on the rules illustrated in FIG. 4.

In operation 705, the network interface unit 130 of the image forming apparatus 10 transmits information about the pop-up event to the determined target devices. Since the UI unit 110, the first mobile device 21, and the second mobile device 23 are determined as the target devices in operation 704, the network interface unit 130 transmits the information about the pop-up event related to turning off power to the UI unit 110, the first mobile device 21, and the second mobile device 23.

In operation 706, the UI unit 110, the first mobile device 21, and the second mobile device 23 display the pop-up window through UI screens based on the received information.

Figure 7B:
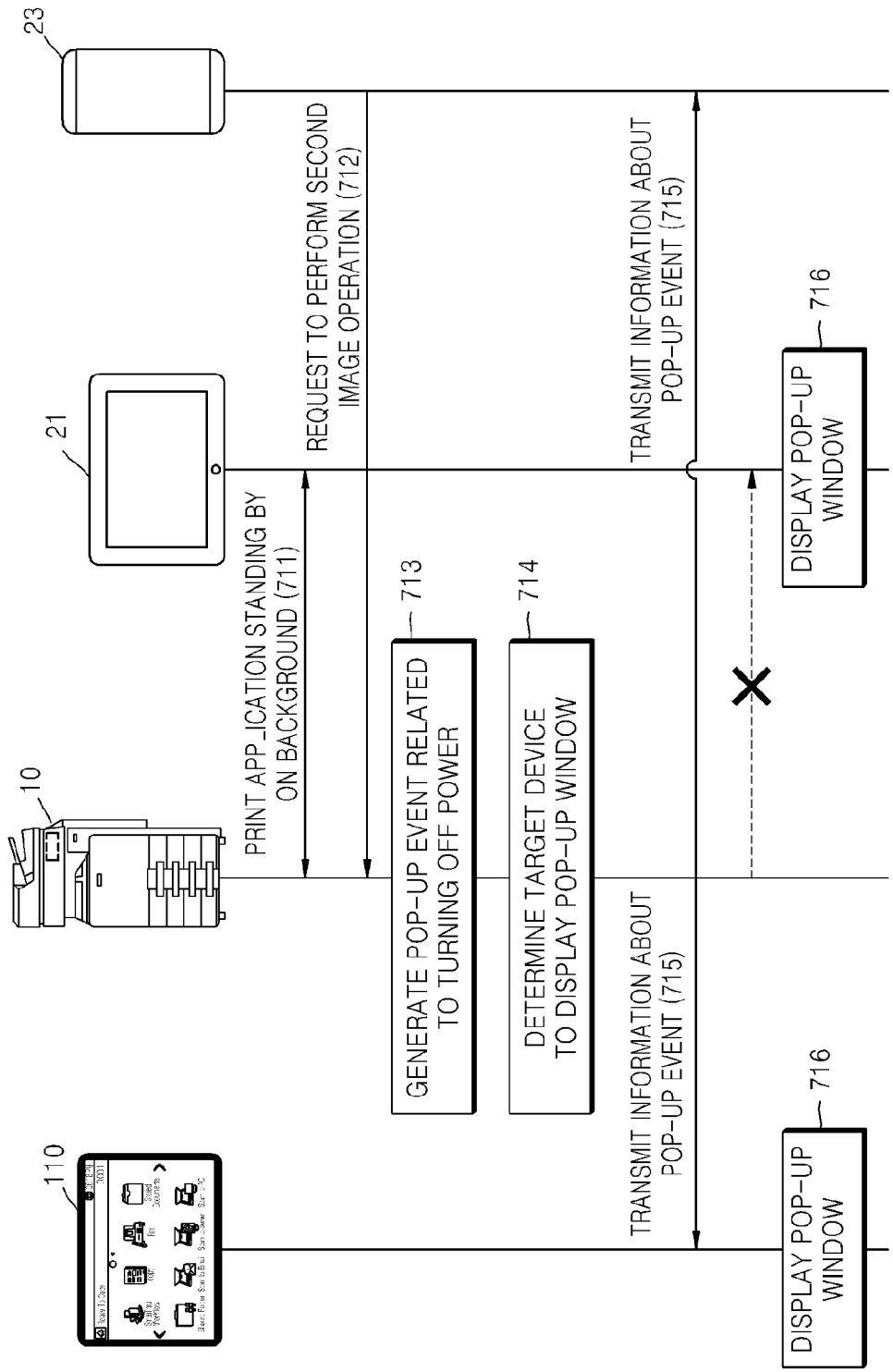
FIG. 7B illustrates operations of an image forming apparatus for controlling display of pop-up windows of a UI unit and mobile devices, when a pop-up event related to turning off power is generated, according to an embodiment.

FIG. 7B illustrates operations of the image forming apparatus 10 for controlling display of pop-up windows of the UI unit 110 and the first and second mobile devices 21 and 23, when a pop-up event related to turning off power is generated, according to an embodiment.

In operation 711, the first mobile device 21 is connected to the image forming apparatus 10, and did not separately request an image operation but is in a state where a print application is standing by on a background.

In operation 712, the second mobile device 23 requests the image forming apparatus 10 to perform a second image operation. Here, the second image operation may include a copy operation, a print operation, or a scan operation using a print application executed in the second mobile device 23.

In FIG. 7B, it is assumed that the second image operation is requested by the second mobile device 23 (operation 712) after the print application is standing by on the background in the first mobile device 21 (operation 711), but an order of operations 711 and 712 may be switched.

In operation 713, the control unit 120 of the image forming apparatus 10 continuously monitors generation of a pop-up event during an operation of the image forming apparatus 10. As a result, the control unit 120 detects that a pop-up event related to turning off power is generated during the operation of the image forming apparatus 10.

Here, the pop-up event related to turning off power may denote a pop-up event generated by a software button for powering off the image forming apparatus 10 through software installed in the image forming apparatus 10, instead of a physical hardware button included in the image forming apparatus 10.

In operation 714, the control unit 120 of the image forming apparatus 10 determines at least one target device to be requested to display a pop-up window indicating a pop-up event from among the UI unit 110 and the first and second mobile devices 21 and 23 connected to the image forming apparatus 10.

Here, the control unit 120 may determine a target device to display a pop-up window based on the rules illustrated in FIG. 4.

As illustrated in FIG. 4, when the pop-up event related to turning off power is generated, a mobile device in a state where an image operation is already requested or a state where a print application is being executed on a foreground is determined as a target device.

Accordingly, the control unit 120 determines the UI unit 110 and the second mobile device 23 as the target devices based on the rules illustrated in FIG. 4.

In operation 715, the network interface unit 130 of the image forming apparatus 10 transmits information about the pop-up event to the determined target devices. Since the UI unit 110 and the second mobile device 23 are determined as the target devices in operation 714, the network interface unit 130 transmits the information about the pop-up event related to turning off power to the UI unit 110 and the second mobile device 23.

In operation 716, the UI unit 110 and the second mobile device 23 display the pop-up window through UI screens based on the received information.

According to FIG. 7B, unlike FIG. 7A, since the print application is standing by on the background in the first mobile device 21, the first mobile device 21 is not a target device to display a pop-up window based on the rules illustrated in FIG. 4. Accordingly, unlike FIG. 7A, the network interface unit 130 does not transmit the information about the pop-up event to the first mobile device 21, and thus the pop-up window is not displayed on the first mobile device 21.

FIG. 8 illustrates operations of the image forming apparatus 10 for controlling display of pop-up windows of the UI unit 110 and first through fourth mobile devices 21, 23, 25, and 27, when a pop-up event related to malfunction of the image forming apparatus 10 is generated, according to an embodiment.

In operation 801, the first mobile device 21 requests the image forming apparatus 10 to perform a first image operation. The first image operation may include a copy operation, a print operation, or a scan operation using a print application executed in the first mobile device 21.

In operation 802, the second mobile device 23 is connected to the image forming apparatus 10, and did not separately request an image operation but is in a state where a print application is being executed on a foreground.

Here, the state where the print application is being executed on the foreground may include cases when a function related to a copy operation, a print operation, a scan operation, or a fax operation is activated from among functions of the print application.

In operation 803, the third and fourth mobile devices 25 and 27 are connected to the image forming apparatus 10, and did not request an image operation or are in a state where a print application is not being executed.

In FIG. 8, it is assumed that the print application is executed in the second mobile device 23 (operation 802) and then the third and fourth mobile devices 25 and 27 are connected (operation 803) after the first image operation is requested by the first mobile device 21 (operation 801), but an order of operations 801 through 803 may be changed.

In operation 804, the control unit 120 of the image forming apparatus 10 continuously monitors generation of a pop-up event during an operation of the image forming apparatus 10. As a result, the control unit 120 detects that a pop-up event related to malfunction of the image forming apparatus 10 is generated during the operation of the image forming apparatus 10.

The pop-up event related to malfunction of the image forming apparatus 10 may denote malfunction of hardware in the image forming apparatus 10, for example, no toner or malfunction of a network card.

In operation 805, the control unit 120 of the image forming apparatus 10 determines at least one target device to be requested to display a pop-up window indicating the pop-up event from among the UI unit 110 and the first through fourth mobile devices 21 through 27 connected to the image forming apparatus 10.

The control unit 120 may determine the target device to display the pop-up window based on the rules illustrated in FIG. 4.

As illustrated in FIG. 4, when the pop-up event related to malfunction of the image forming apparatus 10 is generated, all devices connected to the image forming apparatus 10 may be determined as the target devices.

Accordingly, the control unit 120 determines the UI unit 110 and the first through fourth mobile devices 21 through 27 as the target devices based on the rules illustrated in FIG. 4.

In operation 806, the network interface unit 130 of the image forming apparatus 10 transmits information about the pop-up event to the determined target devices. Since the UI unit 110 and the first through fourth mobile devices 21 through 27 are determined as the target devices in operation 805, the network interface unit 130 transmits the information about the pop-up event related to malfunction of the image forming apparatus 10 to the UI unit 110 and the first through fourth mobile devices 21 through 27.

In operation 807, the UI unit 110 and the first through fourth mobile devices 21 through 27 display the pop-up window through UI screens based on the received information.

Figure 9:
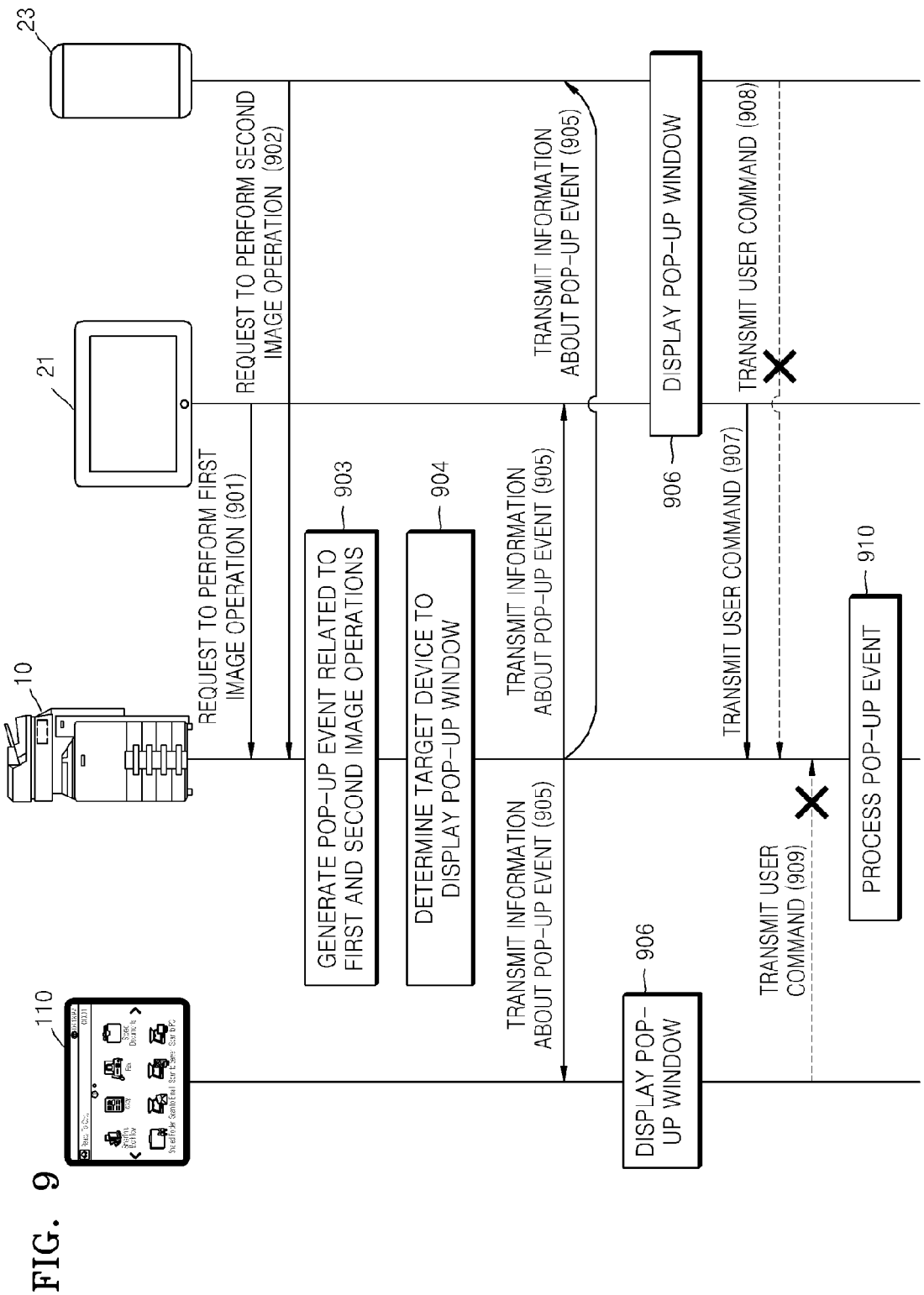
FIG. 9 illustrates operations of an image forming apparatus for processing a pop-up event by using user commands input through a UI unit and mobile devices, according to an embodiment.

FIG. 9 illustrates operations of the image forming apparatus 10 for processing a pop-up event by using user commands input through the UI unit 110 and the first and second mobile devices 21 and 23, according to an embodiment.

In operation 901, the first mobile device 21 requests the image forming apparatus 10 to perform a first image operation. The first image operation may include a copy operation, a print operation, or a scan operation using a print application executed in the first mobile device 21.

In operation 902, the second mobile device 23 requests the image forming apparatus 10 to perform a second image operation. The second image operation may include a copy operation, a print operation, or a scan operation using a print application executed in the second mobile device 23.

Even when the first and second image operations are the same type, the first and second image operations are requested by different mobile devices, i.e., the first and second mobile devices 21 and 23, and thus the image forming apparatus 10 manages job IDs to be different.

In FIG. 9, it is assumed that the second image operation is requested by the second mobile device 23 (operation 902) after the first image operation is requested by the first mobile device 21 (operation 901), but an order of operations 901 and 902 may be switched.

In operation 903, the control unit 120 of the image forming apparatus 10 continuously monitors generation of a pop-up event during an operation of the image forming apparatus 10. As a result, the control unit 120 detects that a pop-up event related to the first and second image operations is generated during the operation of the image forming apparatus 10.

The pop-up event related to the first and second image operations may include an event about a paper jam, an event about no paper, and an event about a paper size mismatch.

In operation 904, the control unit 120 of the image forming apparatus 10 determines at least one target device to be requested to display a pop-up window indicating the pop-up event from among the UI unit 110 and the first and second mobile devices 21 and 23 connected to the image forming apparatus 10.

The control unit 120 may determine the target device to display the pop-up window based on the rules illustrated in FIG. 4.

As illustrated in FIG. 4, when a pop-up event related to an image operation is generated, a mobile device in a state where the image operation is already requested is determined as a target device. Accordingly, since it is monitored that the pop-up event related to the first and second image operations is generated in operation 903, the control unit 120 determines the UI unit 110 and the first and second mobile devices 21 and 23 as the target devices based on the rules illustrated in FIG. 4.

In operation 905, the network interface unit 130 of the image forming apparatus 10 transmits information about the pop-up event to the determined target devices. Since the UI unit 110 and the first and second mobile devices 21 and 23 are determined as the target devices in operation 904, the network interface unit 130 transmits the information about the pop-up event related to the first and second image operations to the UI unit 110 and the first and second mobile devices 21 and 23.

In operation 906, the UI unit 110 and the first and second mobile devices 21 and 23 display the pop-up window through UI screens based on the received information.

In operation 907, the first mobile device 21 receives a user command for processing the pop-up event through the displayed pop-up window from a user. The first mobile device 21 transmits the user command received through the displayed pop-up window to the image forming apparatus 10.

In operation 908, the second mobile device 23 receives a user command for processing the pop-up event through the displayed pop-up window from a user. The second mobile device 23 transmits the user command received through the displayed pop-up window to the image forming apparatus 10.

In operation 909, the UI unit 110 receives a user command for processing the pop-up event through the displayed pop-up window from a user. The UI unit 110 transmits the user command received through the displayed pop-up window to the image forming apparatus 10.

The user of the first mobile device 21, the user of the second mobile device 23, and the user of the UI unit 110 may input the user commands through corresponding devices.

However, the user commands input by the users of the first and second mobile devices 21 and 23 and UI unit 110 may reach the image forming apparatus 10 at different points of time.

In an embodiment, it is assumed that the user command transmitted from the first mobile device 21 in operation 907 first reaches the image forming apparatus 10.

In operation 910, the control unit 120 of the image forming apparatus 10 processes the pop-up event by using the user command of the first mobile device 21 that first reached from among the user commands of the UI unit 110 and the first and second mobile devices 21 and 23.

Accordingly, the control unit 120 ignores the user commands transmitted from the UI unit 110 and the second mobile device 23.

Figure 10:
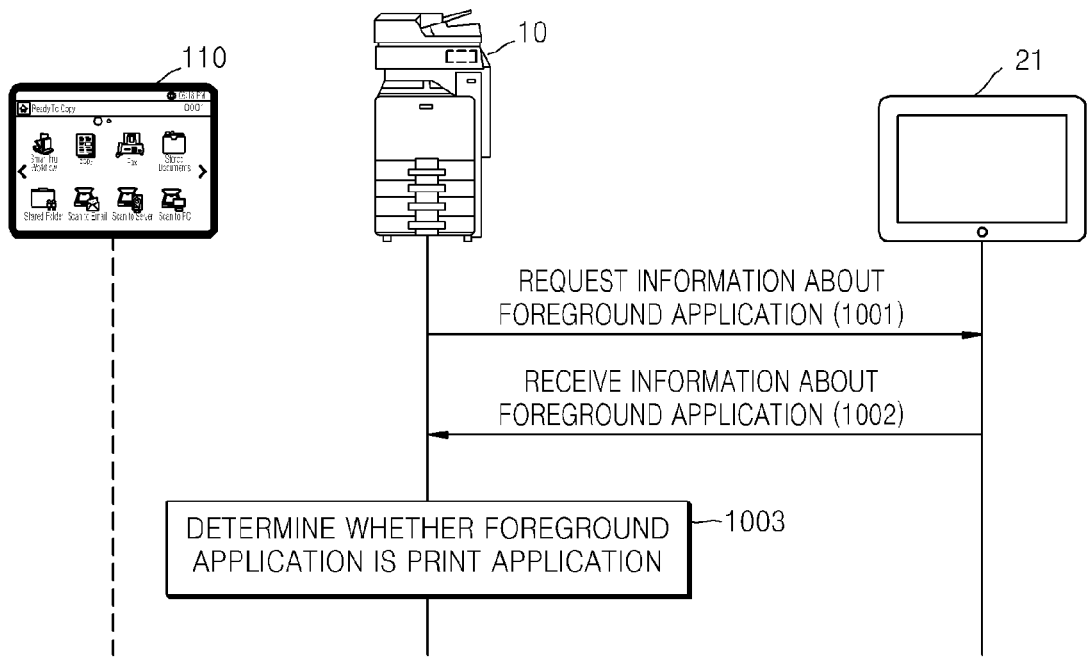
FIG. 10 illustrates operations for determining whether a foreground application being executed on a mobile device is a print application, according to an embodiment.

FIG. 10 illustrates operations for determining whether a foreground application being executed on the mobile device 20 is a print application, according to an embodiment.

The mobile device 20 of FIG. 10 may correspond to the first or second mobile device 21 or 23 described above.

In operation 1001, the control unit 120 of the image forming apparatus 10 requests the mobile device 20 for information about the foreground application being executed through the network interface unit 130.

The network interface unit 130 may transmit a message, such as <<http://192.168.0.xxx/request/foreground/whatIsForeground>> to the mobile device 20 so as to request for the information about the foreground application. The network interface unit 130 may transmit a message, such as <<http://192.168.0.xxx/request/foreground/PrintappIsForeground>> to the mobile device 20 so as to inquire whether a print application is being executed in the foreground application, thereby requesting for the information about the foreground application.

In operation 1002, the network interface unit 130 receives the information about the foreground application from the mobile device 20.

A mobile device 20 may transmit a message, such as <<http://192.168.0.xxx/response/foreground/copy>> to the image forming apparatus 10 so as to transmit the information about the foreground application. The mobile device 20 may transmit a message, such as <<http://192.168.0.xxx/response/foreground/yes>> to the image forming apparatus 10 so as to transmit the information about the foreground application.

In operation 1003, the control unit 120 determines whether the foreground application corresponds to the print application based on the message received from the mobile device 20.

Figure 11:
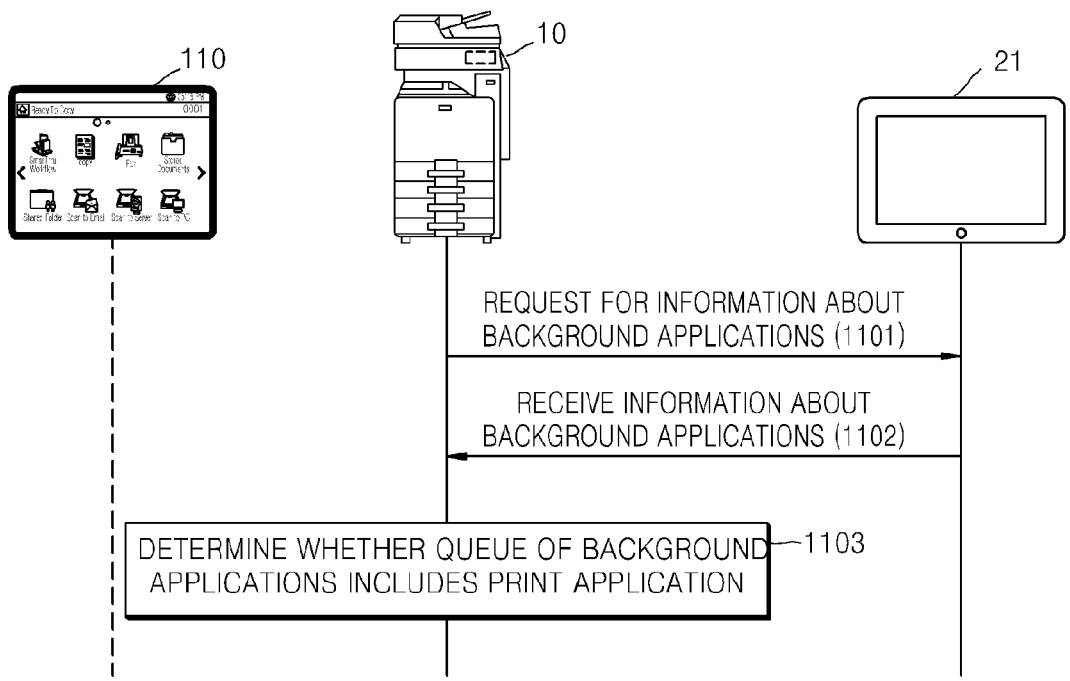
FIG. 11 illustrates operations for determining whether background applications being executed on a mobile device include a print application, according to an embodiment.

FIG. 11 illustrates operations for determining whether background applications being executed on the mobile device 20 include a print application, according to an embodiment.

In operation 1101, the control unit 120 of the image forming apparatus 10 requests the mobile device 20 for information about the background applications through the network interface unit 130. The information about the background applications may include information about a queue of applications being executed on a background.

In operation 1102, the network interface unit 130 of the image forming apparatus 10 receives the information about the background applications from the mobile device 20.

In operation 1103, the control unit 120 determines whether a queue of the background applications includes a print application based on the information received from the mobile device 20.

Figure 12:
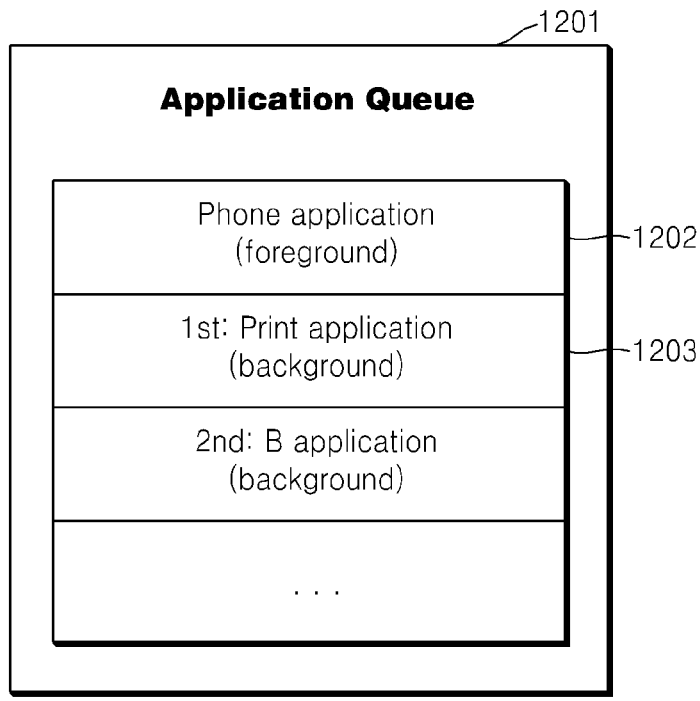
FIG. 12 illustrates an application queue included in information about background applications, according to an embodiment.

FIG. 12 illustrates an application queue 1201 included in information about background applications, according to an embodiment.

As illustrated in FIG. 12, the application queue 1201 being executed on the mobile device 20 may include a foreground application list and a background application list.

A phone application 1202 may be being currently executed on the mobile device 20, as a foreground application. A print application 1203 may be being executed on the mobile device 20, as a first background application. A B application, i.e., a copy application, may be being executed as a second background application.

Someone may call the mobile device 20, such as a smartphone, while the user is performing an image operation by using the print application 1203 in the mobile device 20. If the user answers the call, the phone application 1202 may be executed as a foreground application and the print application 1203 may be executed as a background application. When the user finishes the call, it may be assumed that the phone application 1202 has ended and the user performs the image operation again by using the print application 1203. When the print application 1203 is within a predetermined ranking of the application queue 1201, it may be determined that the user is about to use the image forming apparatus 10.

A predetermined ranking may be changed by the user or a manager of the image forming apparatus 10.

As illustrated in FIG. 11, in operation 1103, the control unit 120 determines whether the print application is within a predetermined ranking of the queue of the background applications.

A list of applications included in the application queue 1201 of FIG. 12 is only an example, and thus an embodiment is not limited thereto.

Figure 13:
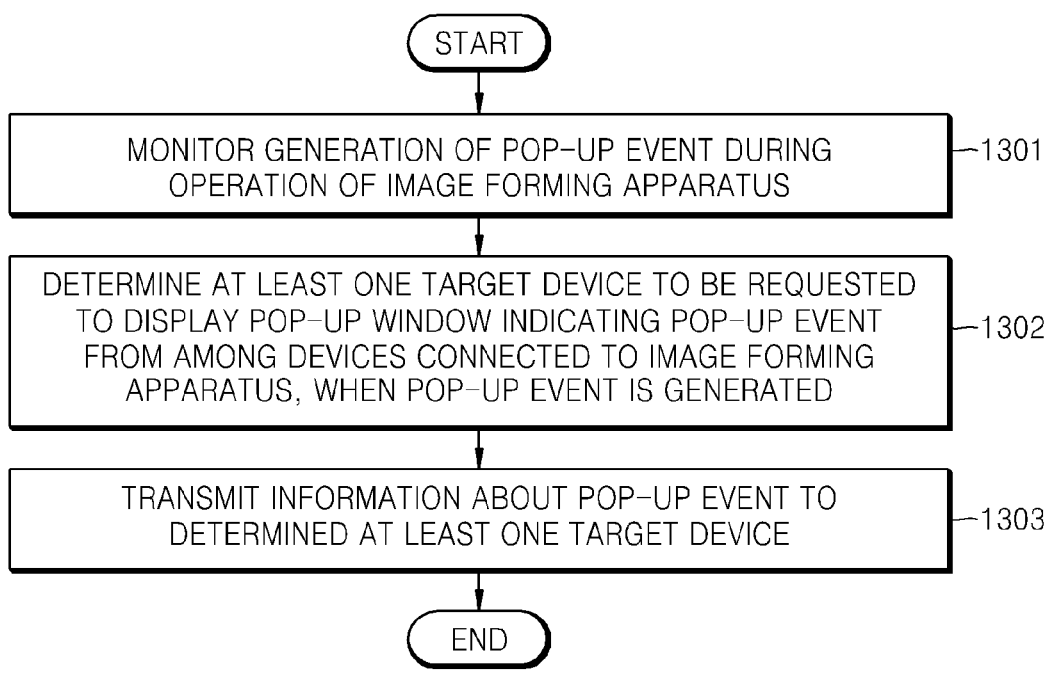
FIG. 13 illustrates a method of controlling display of a pop-up window, wherein the method is performed by an image forming apparatus, according to an embodiment.

FIG. 13 is a flowchart of a method of the image forming apparatus 10 controlling display of a pop-up window, according to an embodiment.

As illustrated in FIG. 13, since the method includes operations that may be by an image forming apparatus described above with reference to FIGS. 1 through 12, and details described above with reference to FIGS. 1 through 12 may also be applied to FIG. 13 even though omitted.

In operation 1301, the control unit 120 of the image forming apparatus 10 monitors generation of a pop-up event during an operation of the image forming apparatus 10.

In operation 1302, the control unit 120 of the image forming apparatus 10 determines at least one target device to be requested to display a pop-up window indicating the pop-up event from among devices connected to the image forming apparatus 10, when the pop-up event is generated.

The connected devices may include the UI unit 110 of the image forming apparatus 10, which is removable, and at least one external mobile device, for example, the first and second mobile devices 21 and 23.

In operation 1303, the network interface unit 130 of the image forming apparatus 10 transmits information about the pop-up event to the determined at least one target device.

An exemplary embodiment can be written as computer programs and can be implemented in general-use digital computers that execute the programs using a non-transitory computer-readable recording medium. Examples of the computer-readable recording medium include magnetic storage media (e.g., ROM, floppy disks, hard disks, etc.), optical recording media (e.g., CD-ROMs or DVDs), etc.

As described above, according to the one or more of the above embodiments, when a plurality of devices are connected to an apparatus, e.g., image forming apparatus, a device for displaying a window, e.g., pop-up window about an event. e.g., pop-up event generated in the image forming apparatus is pre-set so as to prevent devices unrelated to the generated event, e.g., pop-up event from indiscriminately displaying the window, e.g., pop-up window.

While one or more embodiments have been described with reference to the figures, it will be understood by those of ordinary skill in the art that various changes in form and details may be made therein without departing from the spirit and scope as defined by the following claims.

What is claimed is:

1. A method performed by an image forming apparatus, the method comprising:
   monitoring generation of a pop-up event during operations of the image forming apparatus with a processor of the image forming apparatus; and
   after the monitored pop-up event is generated:
      identifying a current state of each of a plurality of devices that are connected to the image forming apparatus based on at least one of a state of an application executable on a foreground of a respective device of the plurality of devices and a state of another application executable on a background of the respective device of the plurality of devices,
      determining at least one target device that is to be requested to display a pop-up window indicating the pop-up event has been generated from among the plurality of devices connected to the image forming apparatus based on the identified current state of each of the connected devices, and
      transmitting information about the generated pop-up event to the determined at least one target device from among the devices connected to the image forming apparatus.

2. The method of claim 1, further comprising determining a type of the generated pop-up event,
   wherein the determining the at least one target device that is requested to display the pop-up window indicating the generated pop-up event comprises further considering of the type of the generated pop-up event, and
   wherein the type of the generated pop-up event comprises at least one of an event about a state of a tray, an event about a malfunction generated in the image forming apparatus, an event about a paper jam, an event about no paper, an event about a paper size mismatch, an event about fax reception, and an event about turning off power.

3. The method of claim 1, further comprising pre-storing rules for determining the at least one target device when the monitored pop-up event is generated,
   wherein the determining comprises determining the at least one target device by using the pre-stored rules, and
   wherein at least some of the pre-stored rules include an action to be taken based on both a type of the generated pop-up event and a state of target device.

4. The method of claim 1, wherein the identifying comprises identifying a mobile device that is in a job requested state as the at least one target device, when the generated pop-up event is related to the image operation.

5. The method of claim 4, wherein the image operation comprises at least one of a copy operation, a print operation, and a scan operation, and
   the generated pop-up event comprises at least one of an event about a paper jam, an event about no paper, and an event about a paper size mismatch.

6. The method of claim 1, wherein the determining comprises determining a mobile device that is in a job requested state, the state of the application executable on the foreground or the state of the another application executable on the background as the at least one target device, when the generated pop-up event is related to an event about a state of a tray.

7. The method of claim 1, wherein the determining comprises determining all of the devices connected to the image forming apparatus as the at least one target device, when the generated pop-up event is related to malfunction of the image forming apparatus.

8. The method of claim 1, wherein the determining comprises determining a mobile device that is in a job requested state or the foreground running state as the at least one target device, when the generated pop-up event is related to the turning off the image forming apparatus.

9. The method of claim 1, wherein the devices connected to the image forming apparatus comprise a removable user interface unit of the image forming apparatus and a plurality of external mobile devices, and
   wherein the determining comprises determining the removable user interface unit as the at least one target device regardless of types of the generated pop-up event, after the pop-up event is generated.

10. The method of claim 1, wherein the determining comprises determining a mobile device logged in as a manager as the at least one target device, regardless of types of the generated pop-up event, after the pop-up event is generated.

11. The method of claim 1, further comprising, when the information about the generated pop-up event is transmitted to a plurality of target devices, processing the generated pop-up event by using a user command that is first received from among user commands input from the plurality of target devices.

12. The method of claim 1, wherein a first mobile device of the devices connected to the image forming apparatus is a different type of mobile device than a second mobile device of the devices connected to the image forming apparatus.

13. The method of claim 1, wherein the information about the generated pop-up event is not transmitted to at least one non-target device from among the devices connected to the image forming apparatus based on the determination.

14. An image forming apparatus comprising:
at least one memory storing instructions;
a controller including at least one processor configured to execute the instructions stored in the at least one memory to cause the following to be performed:
after a monitored pop-up event is generated, identify a current state of each of a plurality of devices that are connected to the image forming apparatus based on at least one of a state of an application executable on a foreground of a respective device of the plurality of devices and a state of another application executable on a background of the respective device of the plurality of devices, and
determine at least one target device that is to be requested to display a pop-up window indicating the monitored pop-up event has been generated from among the plurality of devices connected to the image forming apparatus based on the identified state of the each of the connected devices; and
a network interface configured to transmit information about the generated pop-up event to the at least one target device determined by the controller from among the devices connected to the image forming apparatus.

15. The image forming apparatus of claim 14, further comprising storage for pre-storing rules relating a type of pop-up event and a state of a mobile device for determining the at least one target device after the pop-up event is generated,
wherein the controller determines the at least one target device by using the pre-stored rules.

16. The image forming apparatus of claim 14, wherein the controller determines a mobile device that is in a job requested state as the at least one target device, when the generated pop-up event is related to the image operation.

17. The image forming apparatus of claim 14, wherein the devices connected to the image forming apparatus comprise a removable user interface unit of the image forming apparatus and a plurality of external mobile devices, and
wherein the controller determines the removable user interface unit, or a mobile device logged in as a manager as the at least one target device, regardless of types of the generated pop-up event, after the monitored pop-up event is generated.

18. The image forming apparatus of claim 14, wherein the network interface receives user commands input from a plurality of target devices when the information about the generated pop-up event is transmitted to the plurality of target devices, and the controller processes the generated pop-up event by using a user command that is first received from among the received user commands.

19. The image forming apparatus of claim 14, wherein a first mobile device of the devices connected to the image forming apparatus is a different type of mobile device than a second mobile device of the devices connected to the image forming apparatus.

20. The image forming apparatus of claim 14, wherein the network interface does not transmit the information about the generated pop-up event to at least one non-target device from among the devices connected to the image forming apparatus based on the determination.

21. An image forming apparatus, comprising:
at least one memory storing instructions;
a controller including at least one processor configured to execute the instructions stored in the at least one memory to cause the following to be performed:
monitor generation of a notification event during operations of the image forming apparatus,
after the monitored notification event is generated, identify a current state of each of a plurality of devices that are connected to the image forming apparatus based on at least one of a state of an application executable on a foreground of a respective device of the plurality of devices and a state of another application executable on a background of the respective device of the plurality of devices; and
a network interface configured to transmit information about the generated notification event to at least one target device from among the plurality of devices connected to the image forming apparatus based on the identified state of each of the plurality of devices connected to the image forming apparatus, after the notification event is generated.

22. The image forming apparatus of claim 21, wherein the generated notification event comprises at least one of an event about a paper jam, an event about no paper, and an event about a paper size mismatch.

23. The image forming apparatus of claim 21, wherein the network interface does not transmit the information about the generated notification event to at least one non-target device from among the devices connected to the image forming apparatus based on the determination.

* * * * *